United States Patent
Harada

(10) Patent No.: US 9,242,566 B2
(45) Date of Patent: Jan. 26, 2016

(54) BRUSHLESS MOTOR CONTROL APPARATUS AND BRUSHLESS MOTOR CONTROL METHOD

(75) Inventor: Tomomi Harada, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 179 days.

(21) Appl. No.: 14/113,507

(22) PCT Filed: Apr. 25, 2012

(86) PCT No.: PCT/JP2012/061056
§ 371 (c)(1),
(2), (4) Date: Nov. 22, 2013

(87) PCT Pub. No.: WO2012/153637
PCT Pub. Date: Nov. 15, 2012

(65) Prior Publication Data
US 2014/0070769 A1    Mar. 13, 2014

(30) Foreign Application Priority Data

May 6, 2011  (WO) .................. PCT/JP2011/060583

(51) Int. Cl.
*B60L 11/08*    (2006.01)
*H02P 9/48*     (2006.01)
(Continued)

(52) U.S. Cl.
CPC ............. *B60L 11/08* (2013.01); *F02D 41/0097* (2013.01); *F02N 11/04* (2013.01); *H02P 3/22* (2013.01); *H02P 6/182* (2013.01); *H02P 9/48* (2013.01); *H02P 2209/01* (2013.01)

(58) Field of Classification Search
CPC .................................. B60L 11/08; H02P 6/16

USPC .......................................................... 320/109
See application file for complete search history.

(56) References Cited

U.S. PATENT DOCUMENTS 5,493,200 A * 2/1996 Rozman et al. .................. 322/10
5,969,491 A * 10/1999 Viti et al. .................. 318/400.35
(Continued)

FOREIGN PATENT DOCUMENTS

JP     07-274585    10/1995
JP     2003-164190    6/2003
(Continued)

OTHER PUBLICATIONS

International Search Report for PCT/JP2012/061056 mailed Aug. 7, 2012.
(Continued)

*Primary Examiner* — Sun Lin
(74) *Attorney, Agent, or Firm* — Nixon & Vanderhye P.C.

(57) ABSTRACT

A brushless motor control apparatus calculates the number of rotations of an engine based on a cycle of zero-cross points of the phase voltage induced to a sub-coil of a three-phase brushless motor. When the number of rotation of the engine is smaller than the first number of rotations, before it becomes impossible to detect the zero-cross points, the control state of the three-phase brushless motor is changed from the state of phase control by a phase control regulator unit with respect to the AC output voltages to the state of interphase short circuit of motor coils by a short regulator unit. When the number of rotations of the engine exceeds the first number of rotations and the phase voltage becomes the voltage level such that the zero-cross points can be detected, the control state is changed again to the state of phase control by the phase control regulator unit.

5 Claims, 14 Drawing Sheets

(51) Int. Cl.
    *H02P 3/22*      (2006.01)
    *H02P 6/18*      (2006.01)
    *F02D 41/00*      (2006.01)
    *F02N 11/04*      (2006.01)

(56) References Cited

U.S. PATENT DOCUMENTS

| | | |
|---|---|---|
| 8,084,975 B2 * | 12/2011 | Harada .................. 318/400.33 |
| 2009/0160408 A1 | 6/2009 | Suzuki et al. |
| 2010/0117572 A1 | 5/2010 | Harada et al. |
| 2014/0035501 A1 * | 2/2014 | Harada .................. 318/400.35 |

FOREIGN PATENT DOCUMENTS

| | | |
|---|---|---|
| JP | 2005-124328 | 5/2005 |
| JP | 2006-136122 | 5/2006 |
| JP | 2007-252058 | 9/2007 |
| JP | 2008-061335 | 3/2008 |
| JP | 2008-137550 | 6/2008 |
| JP | A-2010-207053 | 9/2010 |
| WO | WO 2007/114272 | 10/2007 |
| WO | WO 2008/120734 | 10/2008 |

OTHER PUBLICATIONS

Written Opinion of the International Searching Authority mailed Aug. 7, 2012.
Ochije et al., "Design and Control of AC/DC Converter for a High Speed Brushless Generator for Minimum KVA Rating," Conference Record of the 2003 IEEE Industry Applications Conference, 38$^{th}$ IAS Annual Meeting, Salt Lake City, UT, Oct. 12-16, 2003; [Conference Record of the 2003 IEEE Industry Applications Conference, 38$^{th}$ IAS Annual Meeting], New York, NY: IEEE, U.S., vol. 2, Oct. 12, 2003, pp. 701-708.
Nov. 18, 2015 Supplementary European Search Report issued in European Application No. 12 78 1792.2.

* cited by examiner

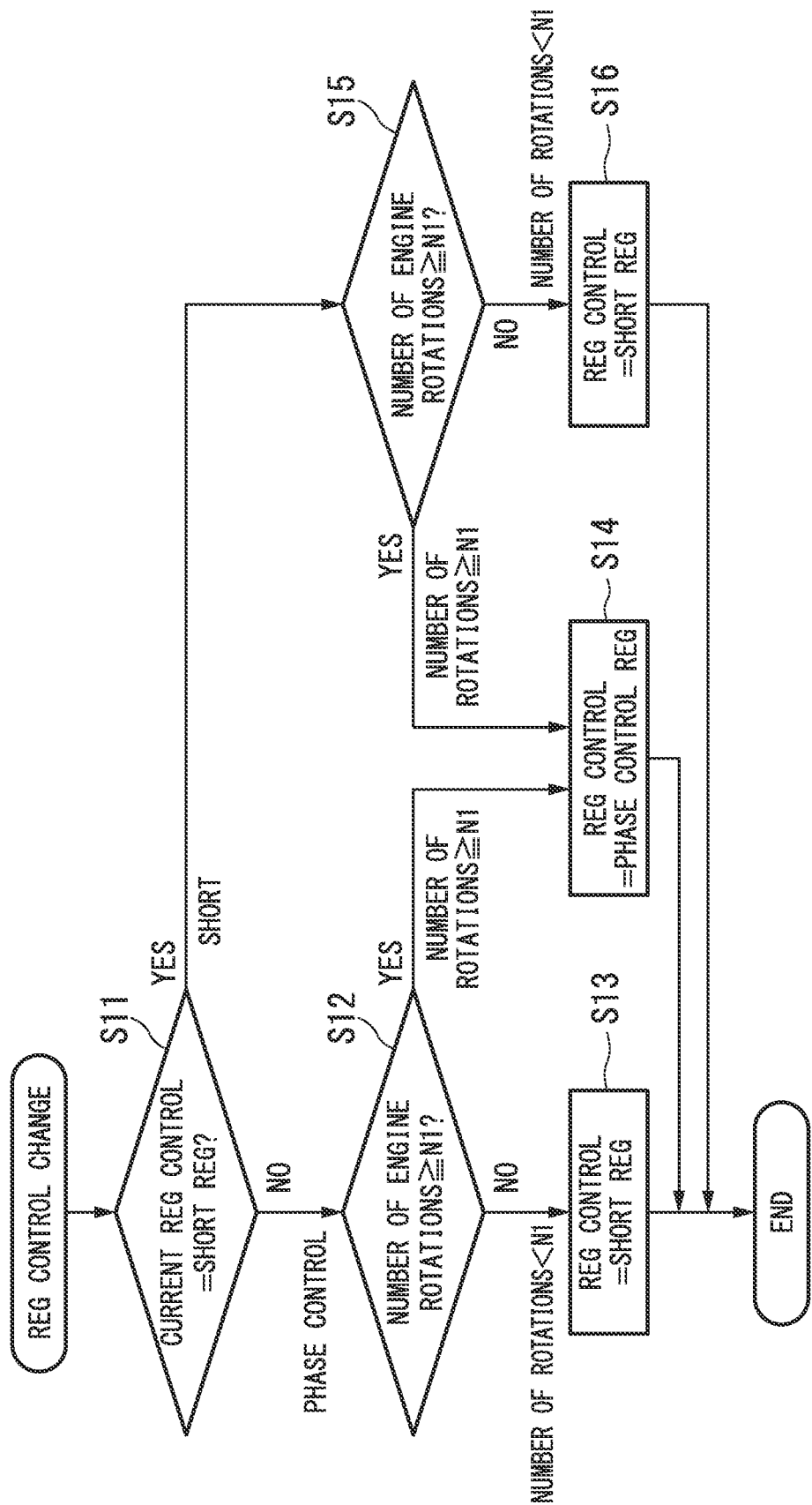

BRUSHLESS MOTOR CONTROL APPARATUS AND BRUSHLESS MOTOR CONTROL METHOD

This application is the U.S. national phase of International Application No. PCT/JP2012/061056, filed 25 Apr. 2012, which designated the U.S. and claims priority to Japanese Patent Application No. PCT/JP2011/060583, filed 6 May 2011, the entire contents of each of which are hereby incorporated by reference.

TECHNICAL FIELD

The present invention relates to an apparatus and a method for controlling a three-phase brushless motor to be used as a starter motor and an alternate current power generator of an internal combustion (engine).

BACKGROUND ART

Generally, as systems for drive-controlling three-phase brushless motors (hereinafter, simply referred to as "motors") to be used as starter motors and alternate current power generators of internal combustions (engines), sensor drive control circuits have been known. In a sensor drive control circuit, multiple hole devices for detecting the position of a rotor (on the permanent magnet side) in a three-phase brushless motor are mounted around the rotor. However, the sensor drive control circuit requires that multiple hole devices be provided in the motor and requires that a magnet or the like for detecting the position of the rotor be mounted separately from the rotor as needed, thereby interfering with miniaturization and cost reduction of the motor. Additionally, the precision of detecting the position of the rotor occasionally varies depending on the mounted state of the hole device. For this reason, implementation of a sensorless drive control circuit that detects the position of a rotor without using a sensor such as a hole device has been strongly demanded.

For example, there is a battery charging device that: generates a rectangular wave synchronized with zero-cross points of the AC output voltage of one of the three phases of a three-phase brushless motor (brushless motor that functions as an AC power generator), which is detected by a sub-coil Su in the three-phase brushless motor; generates, based on that rectangular wave, rectangular waves synchronized with the two other phases; and then, based on those rectangular waves (rotor position detection waveforms), rectifies and phase-controls the AC output voltage of the three-phase brushless motor (three-phase AC power generator) (see Patent Document 1).

Additionally, similarly, there is a brushless motor control apparatus that: includes a sub-coil Su that detects the AC output voltage of one of the three phases of the three-phase brushless motor; generates a rectangular wave synchronized with zero-cross points of the AC output voltage of the one phase detected by that sub-coil Su; generates, based on that rectangular wave, rectangular waves synchronized with the two other phases; estimates the position of a rotor based on those rectangular waves (rotor position detection waveforms); and drive-controls the brushless motor (see Patent Document 2).

Further, there is a related control device for a hybrid vehicle (see Patent Document 3). An object of the control device for the hybrid vehicle disclosed in Patent Document 3 is to ensure a desired degree of silence while increasing the precision of detecting the position of a magnetic pole.

CITATION LIST

Patent Document

[Patent Document 1] WO2007/114272
[Patent Document 2] WO2008/120734
[Patent Document 3] Japanese Patent Unexamined Application, First Publication No. 2008-137550

DISCLOSURE OF INVENTION

Problems to be Solved by the Invention

Regarding the battery charging device disclosed in Patent Document 1, zero-cross points are detected from the phase voltage (AC voltage) induced to the sub-coil Su. Then, a rectangular wave synchronized with the phase voltage is generated based on those zero-cross points. Then, rectangular waves synchronized with the other two phases are generated based on that rectangular wave. Then, based on those rectangular waves (rotor position detection waveforms), the AC output voltage of the three-phase brushless motor (three-phase AC power generator) is rectified and phase-controlled, thus charging a battery.

However, regarding the battery charging device disclosed in Patent Document 1, in a case where the number of rotations of an engine is decreased, such as a case where engine stall almost occurs, and thereby the phase voltage is lowered to the degree such that zero-cross points cannot be detected, it is impossible to phase-control the AC output voltage since zero-cross points cannot be detected. In other words, it is impossible to control charging from the three-phase brushless motor (three-phase AC power generator) to the battery. For this reason, there is a possibility that the excessive voltage will be applied to an external load, such as a device to be coupled to the battery.

Additionally, regarding the control device for the hybrid vehicle disclosed in Patent Document 3, when the number of rotations of an engine Ne is greater than or equal to a predetermined number of rotations N2 at the time when the internal combustion is terminated, a regeneration operation (charging of a battery) is performed as a normal regeneration control. When the number of rotations of an engine Ne is smaller than the predetermined number of rotations N2 at the time when the internal combustion is terminated, three-phase short-circuit control for a motor is performed to generate a breaking torque, thereby terminating the rotation of the internal combustion.

For this reason, the control device for the hybrid vehicle disclosed in Patent Document 3 performs, when the number of rotations of the engine is low (less than the number of rotations in the idle state), the three-phase short-circuit for the motor to generate the breaking torque, thereby terminating the engine, thus ensuring silence at the time of the termination.

However, the control device for the hybrid vehicle disclosed in Patent Document 3 cannot control the conductive state of the motor coil of the three-phase brushless motor in situations other than the normal engine operation, such as engine stall (such as when the number of rotations of the engine is low), thereby applying the excessive voltage to the external load.

The present invention has been made in view of the above situations. An object of one aspect of the present invention to provide apparatus and method for controlling a brushless motor, which can control, in a case where a three-phase brushless motor (three AC power generator) is controlled without a position sensor, the conductive states of motor coils of the three-phase brushless motor even in situations other than engine stall or the like, and prevent the excessive voltage from being applied to the external load.

Means for Solving the Problems

The present invention has been made to solve the above problems. A brushless motor control apparatus according to one aspect of the present invention is configured to drive-control a three-phase brushless motor, and rectify and phase-control alternate current output voltages output from the three-phase brushless motor to charge a battery in a case where the three-phase brushless motor is rotary-driven by an engine and operates as a three-phase alternate current power generator. The brushless motor control apparatus includes: a three-phase bridge circuit having arms each including a switching element and a diode coupled in inverse parallel to the switching element; a phase voltage detector configured to detect a phase voltage of any one phase of phases of the three-phase brushless motor; a zero-cross point detector configured to detect zero-cross points of the phase voltage of the one phase detected by the phase voltage detector; a number of engine rotations measurer configured to measure a number of rotations of the engine based on a cycle of the zero-cross points detected by the zero-cross point detector; a phase control regulator unit configured to, when the number of rotations of the engine is greater than or equal to a first number of rotations, rectify and phase-control the alternate current output voltages of the respective phases output from the three-phase brushless motor, and supply the alternate current output voltages to the battery; and a short regulator unit configured to, when the number of rotations of the engine is smaller than the first number of rotations, according to a charged voltage of the battery, control the switching elements of the three-phase bridge circuit to perform interphase short circuit of the alternate current output voltages output from the three-phase brushless motor, or control the switching elements to be collectively turned off.

The brushless motor control apparatus having such the configuration detects the phase voltage of any one phase of the phases of the three-phase brushless motor and calculates the number of rotations of an engine based on a time interval between zero-cross points of the phase voltage. Then, when the number of rotation of the engine is smaller than the first number of rotations, before it becomes impossible to detect the zero-cross points of the phase voltage, the control state of the three-phase brushless motor is changed from the state of phase control of the alternate current output voltages by the phase control regulator unit to the state of conduction control of motor coils by the short regulator unit. Then, when the number of rotations of the engine exceeds the first number of rotations and the phase voltage becomes the sufficient voltage level such that the zero-cross points can be detected, the control state of the three-phase brushless motor is changed again to the state of phase control of the alternate current output voltages by the phase control regulator unit.

Thus, in a case where a three-phase brushless motor (three-phase AC power generator) without a position sensor is controlled, the brushless motor control apparatus according to one aspect of the present invention can control the conduction state of motor coils of the three-phase brushless motor even in a situation other than engine normal operation, such as engine stall, and prevent the excessive voltage from being applied to an external load.

Additionally, regarding the brushless motor control apparatus according to one aspect of the present invention, the short regulator unit is configured to, when the charged voltage of the battery is greater than or equal to a predetermined determination reference voltage, control the switching elements of the three-phase bridge circuit to perform interphase short circuit of the alternate current output voltages output from the three-phase brushless motor. Additionally, the short regulator unit is configured to, when the charged voltage of the battery is smaller than the predetermined determination reference voltage, control the switching elements to be collectively turned off and charge the battery via the diodes based on the alternate current output voltages output from the three-phase brushless motor.

When the number of rotations of the engine is smaller than the first number of rotations and when the charged voltage of the battery is greater than or equal to a predetermined determination reference voltage, the brushless motor control apparatus having such the configuration controls the switching elements of the three-phase bridge circuit to perform interphase short circuit of the alternate current output voltages output from the three-phase brushless motor. Additionally, when the number of rotations of the engine is smaller than the first number of rotations and when the charged voltage of the battery is smaller than the predetermined determination reference voltage, the brushless motor control apparatus controls the switching elements to be collectively turned off and charges the battery via the diodes coupled in inverse parallel to the switching elements, based on the alternate current output voltages output from the three-phase brushless motor.

Thus, it is possible to control the conduction state of motor coils of the three-phase brushless motor even in a situation other than engine normal operation, such as engine stall, and prevent the excessive voltage from being applied to an external load. Additionally, it is possible to charge the battery even when the number of rotations of the engine is smaller than the first number of rotations.

Further, the brushless motor control apparatus according to one aspect of the present invention further includes a batch off controller configured to, when the number of rotations of the engine is smaller than or equal to a second number of rotations that is smaller than the first number of rotations (the first number of rotations>the second number of rotations), collectively turn off the switching elements of the three-phase bridge circuit.

When the number of rotations of the engine is smaller than or equal to a second number of rotations that is smaller than the first number of rotations (the first number of rotations>the second number of rotations), the brushless motor control apparatus having such the configuration makes the coil terminals of the phases of the three-phase brushless motor in electrically disconnected states.

Thus, when the number of rotations of the engine is low and the engine is in the state of being almost terminated, the three-phase brushless motor is electrically disconnected, and thus control with respect to the three-phase brushless motor can be terminated.

Moreover, regarding the brushless motor control apparatus according to one aspect of the present invention, in a case that the three-phase brushless motor operates as the three-phase alternate current power generator, the brushless motor control apparatus is configured to rectify and phase-control the alternate current output voltages output from the three-phase brushless motor, thus charging the battery. Additionally, in a case where the engine is started-up, the brushless motor control apparatus is configured to drive-control the three-phase brushless motor as a starter motor of the engine.

In a case that the three-phase brushless motor is rotary-driven by the engine side and operates as the three-phase alternate current power generator, the brushless motor control apparatus having such the configuration charges the battery based on the alternate current output voltages output from the three-phase brushless motor. Additionally, in a case where the engine is started-up, the brushless motor control apparatus drive-controls the three-phase brushless motor as a starter motor of the engine.

Thus, it is possible to cause the brushless motor control device to operate as the device for driving the starter motor of the engine as well as the battery charging device.

Additionally, a brushless motor control method according to one aspect of the present invention is a brushless motor control method of drive-controlling a three-phase brushless motor, and rectifying and phase-controlling alternate current output voltages output from the three-phase brushless motor to charge a battery in a case where the three-phase brushless motor is rotary-driven by an engine and operates as a three-phase alternate current power generator. The brushless motor control method includes: a step of constituting arms of a three-phase bridge circuit, each of the arms including a switching element and a diode coupled in inverse parallel to the switching element; a phase voltage detection step of detecting a phase voltage of any one phase of phases of the three-phase brushless motor; a zero-cross point detection step of detecting zero-cross points of the phase voltage of the one phase detected in the phase voltage detection step; a number of engine rotations measurement step of measuring a number of rotations of the engine based on a cycle of the zero-cross points detected in the zero-cross point detection step; a phase control regulator step of, when the number of rotations of the engine is greater than or equal to a first number of rotations, rectifying and phase-controlling alternate current output voltages of the respective phases output from the three-phase brushless motor, and supplying the alternate current output voltages to the battery; and a short regulator step of, when the number of rotations of the engine is smaller than the first number of rotations, according to a charged voltage of the battery, controlling the switching elements of the three-phase bridge circuit to perform interphase short circuit of the alternate current output voltages output from the three-phase brushless motor, or controlling the switching elements to be collectively turned off.

Regarding the brushless motor control method including such steps, the phase voltage of any one phase of the phases of the three-phase brushless motor is detected, and the number of rotations of an engine is calculated based on a time interval between zero-cross points of the phase voltage. Then, when the number of rotation of the engine is smaller than the first number of rotations, before it becomes impossible to detect the zero-cross points of the phase voltage, the control state of the three-phase brushless motor is changed from the state of phase control of the alternate current output voltages by the phase control regulator unit to the state of conduction control of motor coils by the short regulator unit. Then, when the number of rotations of the engine exceeds the first number of rotations and the phase voltage becomes the sufficient voltage level such that the zero-cross points can be detected, the control state of the three-phase brushless motor is changed again to the state of phase control of the alternate current output voltages by the phase control regulator step.

Thus, according to the brushless motor control method according to one aspect of the present invention, in a case where a three-phase brushless motor (three-phase AC power generator) without a position sensor is controlled, the conduction state of motor coils of the three-phase brushless motor can be controlled even in a situation other than engine normal operation, such as engine stall, and the excessive voltage can be prevented from being applied to an external load.

Effects of the Invention

Regarding the brushless motor control apparatus according to one aspect of the present invention, the number of rotations of the engine is calculated from the time interval of the zero-cross points of the phase voltage induced to the coil of the three-phase brushless motor. Then, when the number of rotations of the engine is lower than the first number of rotations, the phase control regulator operation is changed to the short regulator operation before zero-cross points become undetectable. Then, when the number of rotations of the engine exceeds the first number of rotations, and the voltage sufficient to detect zero-cross points at the phase voltage becomes obtainable, the short regulator operation is changed to the phase control regulator operation again.

Thus, the brushless motor control apparatus according to one aspect of the present invention can control, in the case where the three-phase brushless motor (three-phase alternate current power generator) is controlled without a position sensor, the conductive states of the motor coils of the three-phase brushless motor even in the situation other than engine normal operation, such as engine stall, thereby preventing the excessive voltage from being applied to the external load.

BRIEF DESCRIPTION OF THE DRAWINGS

FIG. 3 is a flowchart illustrating operation for a conduction controller 23 to select a regulator.

BEST MODE FOR CARRYING OUT THE INVENTION

Hereinafter, embodiments of the present invention are explained with reference to the accompanying drawings.
(Explanation of Entire Configuration of Brushless Motor Control Apparatus)

Figure 1:
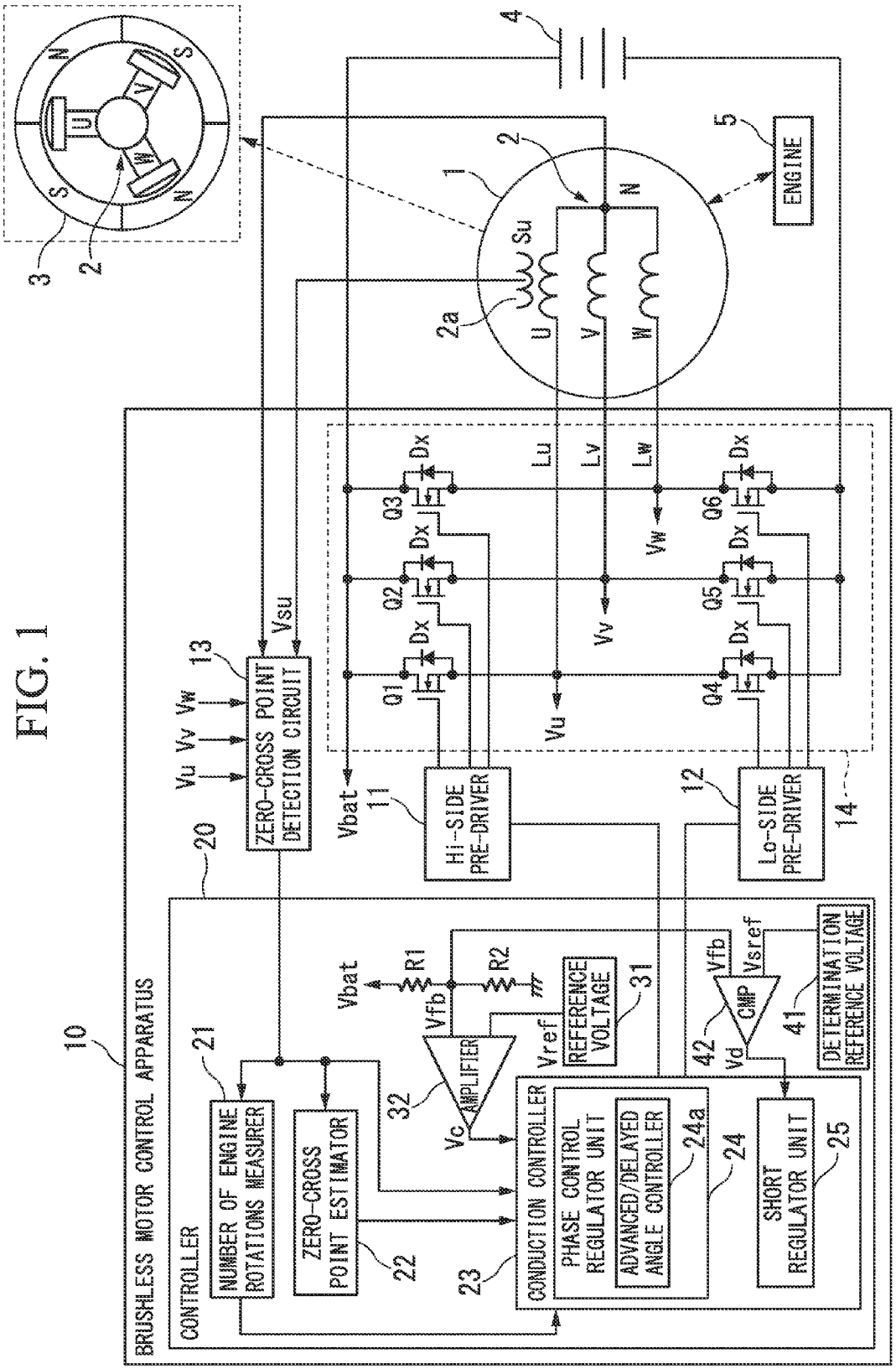
FIG. 1 is a diagram illustrating a configuration of a brushless motor control apparatus according to an embodiment of the present invention.

FIG. 1 is a diagram illustrating a configuration of a brushless motor control apparatus according to an embodiment of the present invention. A brushless motor control apparatus 10 shown in FIG. 1 operates as a battery charging device that, in a case where a three-phase brushless motor 1 is rotary-driven by an engine 5 and operates as a three-phase AC power generator, rectifies and phase-controls the AC output voltage output from the three-phase AC power generator, thus charging a battery 4.

In FIG. 1, the three-phase brushless motor 1 includes: a stator 2 including coils of U, V, and W phases (coils coiled around an iron core) and neutral wires N of the coils; and a rotor 3 including tetrapolar permanent magnets (two pairs of N and S poles). Additionally, coils (coils) of three phases (U, V, and W) are coiled around the stator 2 sequentially in a circumferential direction. Further, the U-phase coil is provided with a sub-coil (Su) 2a for detecting the voltage induced to the U-phase coil (the voltage of a sine wave induced by the permanent magnet of the rotor 3). Here, the sub-coil Su may be provided for another phase (V-phase or W-phase).

A brushless motor control apparatus 10 includes switching elements Q1 to Q6 constituted by a three-phase bridge including Nch-FFTs (field effect transistors). In the three-phase bridge circuit 14, drain terminals of the respective switching elements Q1, Q2, and Q3 on the upper arm side are commonly coupled to a positive terminal of the battery 4 that serves as a direct power source. Additionally, source terminals of the respective switching elements Q4, Q5, and Q6 on the lower arm side are commonly coupled to a negative terminal of the battery 4 that serves as the direct power source.

Additionally, the source terminal of the switching element Q1 on the upper arm side is coupled to the drain terminal of the switching element Q4 on the lower arm side. A connecting point of these switching elements Q1 and Q4 is coupled to the U-phase coil terminal of the three-phase brushless motor 1 via an output power line Lu. Further, the source terminal of the switching element Q2 on the upper arm side is coupled to the drain terminal of the switching element Q5 on the lower arm side. A connecting point of these switching elements Q2 and Q5 is coupled to the V-phase coil terminal of the three-phase brushless motor 1 via an output power line Lv. Moreover, the source terminal of the switching element Q3 on the upper arm side is coupled to the drain terminal of the switching element Q6 on the lower arm side. A connecting point of these switching elements Q3 and Q6 is coupled to the W-phase coil terminal of the three-phase brushless motor 1 via an output power line Lw. Additionally, diodes Dx (parasitic diodes or the like) are coupled in parallel to the respective switching elements Q1 to Q6 such that a cathode is coupled to the positive terminal side of the battery 4, and an anode is coupled to the negative terminal side of the battery 4, as shown in the figure. Here, the switching elements Q1 to Q6 may be IGBTs (insulated gate bipolar transistors) or bipolar transistors.

Additionally, the brushless motor control apparatus 10 includes: a Hi (high)-side pre-driver circuit 11 that on-off drives the switching elements (FETs) Q1, Q2, and Q3 on the upper arm; a Lo (low)-side pre-driver circuit 12 that on-off drives the switching elements (FETs) Q4, Q5, and Q6 on the lower arm side; and a zero-cross point detection circuit 13. The above switching elements Q1 to Q6 are driven by gate driving signals output from the Hi-side pre-driver circuit 11 and the Lo-side pre-driver circuit 12. These gate driving signals are generated by the pre-driver circuits 11 and 12, based on FET driving signals output from a controller (controller including a CPU and the like) 20.

The zero-cross point detection circuit 13 detects zero-cross points from the voltage (U-phase voltage) Vsu induced to the sub-coil Su provided for the U-phase coil of the three-phase brushless motor 1. Additionally, when the three-phase brushless motor 1 rotates at low speed (when 120° conduction is performed as will be explained), the zero-cross point detection circuit 13 detects zero-cross points of the voltages Vu, Vv, and Vw induced to the respective coils (the U-phase coil, the V-phase coil, and the W-phase coil) of the stator 2. Further, when the three-phase brushless motor 1 rotates at high speed (when 180° conduction is performed as will be explained), the zero-cross point detection circuit 13 detects zero-cross points of the voltage (U-phase voltage) Vsu induced to the sub-coil Su provided for the U-phase coil of the three-phase brushless motor 1. This zero-cross point detection circuit 13 outputs to the controller 20, information concerning the detected zero-cross points, as zero-cross point signals.

Here, the zero-cross points occurring at the voltage Vsu induced to the sub-coil Su are zero-cross points occurring when a middle point of the magnetic poles of the rotor 3 (boundary point of N and S poles) matches the position of that coil. Additionally, the zero-cross points occurring at the AC voltage induced to each phase coil (the U-phase coil, the V-phase coil, and the W-phase coil) that is a non-conductive phase at the time of 120° conduction as will be explained later are also zero-cross points occurring when a middle point of the magnetic poles of the rotor 3 (boundary point of N and S poles) matches the position of that coil.

Additionally, the controller 20 includes a number of engine rotations measurer 21, a zero-cross point estimator 22, and a conduction controller 23. The number of engine rotations measurer 21 measures the time interval (cycle) of the zero-cross points detected by the zero-cross point detection circuit 13, thereby measuring the number of rotations of the engine when the three-brushless motor 1 is rotary-driven by the engine 5.

In a case where 180° conduction is performed with respect to the three-phase brushless motor 1, the zero-cross point estimator 22 in the controller 20 receives from the zero-cross point detection circuit 13, information concerning the zero-cross points of the voltage Vsu induced to the sub-coil Su. Then, The zero-cross point estimator 22 measures the time interval T of the zero-cross points (adjacent zero-cross points) of the voltage Vsu induced to the sub-coil Su. For example, the zero-cross point estimator 22 measures the time interval T of the zero-cross points by counting, using a timer or the like, an interval from the time when the a zero-cross point occurs at the output voltage Vsu of the sub-coil Su to the time when the next zero-cross point occurs at the output voltage Vsu.

Further, the zero-cross point estimator 22 calculates intervals of "T/3" and "2T/3" based on the time interval T of the zero-cross points, and thus estimates zero-cross points (phases) of the two other phases (V-phase, W-phase). Then, the zero-cross point estimator 22 outputs to the conduction controller 23, information concerning the zero-cross points of the voltage Vsu induced to the sub-coil Su (zero-cross points of the U-phase), and information concerning the estimated zero-cross points of the two other phases (V-phase, W-phase). The details of the operation for the zero-cross point estimator 22 to estimate the zero-cross points of the two other phases (V-phase, W-phase) will be explained later. Additionally, the sub-coil Su may be provided for the V-phase or the W-phase, not for the U-phase. In this case, based on the voltage Vsu induced to the sub-coil Su, the zero-cross point estimator 22 estimates the zero-cross points of the two other phases not provided with the sub-coil Su.

The conduction controller 23 includes a phase control regulator unit 24 and a short regulator unit 25. The conduction controller 23 receives from the number of engine rotations measurer 21, information concerning the number of rotations of the engine. When the number of rotations of the engine is greater than or equal to the first number of rotations N1, the conduction controller 23 selects the phase control regulator unit 24. When the number of rotations of the engine is smaller than the first number of rotations N1, the conduction controller 23 selects the short regulator unit 25. Thus, the conduction controller 23 controls the AC output voltage of the three-phase brushless motor 1. Here, the first number of rotations N1 is the number of rotations such that zero-cross points of the respective three-phase AC voltages output from the three-phase AC power generator 1 cannot be detected, and phase control with respect to the switching elements Q1 to Q6 cannot be performed. Here, the first number of rotations N1 is obtained by previously measuring the number of rotations of the engine at the time when zero-cross points of the respective three-phase AC output voltages output from the three-phase AC power generator 1 become unable to be detected.

The phase control regulator unit 24 controls the timing of turning on/off of the switching elements Q1 to Q6 based on the information concerning the zero-cross points of the phase voltage Vsu and the zero-cross points estimated by the zero-cross point estimator 22 (phases of the AC output voltages Vu, Vv, and Vw). Thus, the phase control regulator unit 24 rectifies and phase-controls the AC output voltages output from the three-phase brushless motor 1, thereby charging the battery 4. When the three-phase brushless motor 1 is rotary-driven by the engine 5, the phase control regulator unit 24 performs forward conversion (AC/DC conversion) on the three-phase AC output voltages output from the three-phase brushless motor (AC power generator) 1 using the switching elements Q1 to Q6 to obtain the DC output voltages, and thus causes the charging current to flow based on the DC output voltages.

When the number of rotations of the engine is smaller than or equal to the predetermined number of rotations (first number of rotations N1), the short regulator unit 25 controls on/off states of the switching elements Q1 to Q6 in the three-phase bridge circuit 14. When the number of rotations of the engine is smaller than or equal to the predetermined number of rotations (first number of rotations N1), the short regulator unit 25, according to the charged voltage of the battery 4, turns on the lower arm (switching elements Q4, Q5, and Q6) in the three-phase bridge circuit 14 to perform interphase short-circuit of the motor coil terminals of the three-phase brushless motor 1, or collectively turns off the switching elements Q1 to Q6 to charge the battery 4 based on the AC output voltages of the motor 1 via the diodes Dx coupled in inverse parallel to the switching elements Q1 to Q6, as will be explained later.

Additionally, the controller 20 includes: a resistance divider circuit for detecting the battery voltage Vbat (circuit including the resistors R1 and R2); a reference voltage circuit 31 that generates the reference voltage Vref; and a difference amplifier (amplifier) 32 that compares the battery voltage Vbat and the reference voltage Vref.

This difference amplifier 32 compares a feedback signal Vfb from the actual battery voltage Vbat and a set value (target value) Vref of the battery charging voltage, amplifies a signal of the difference therebetween, and outputs the amplified signal as an output Vc of the difference amplifier. Regarding the output Vc of the difference amplifier, "Vc>0" when the battery voltage Vbat is low and "Vfb<Vref", and "Vc<0" when the battery voltage Vbat is high and "Vfb>Vref". When "Vc>0", charging of the battery 4 (delayed angle control) is performed by the phase control regulator 24. When "Vc<0", discharging of the battery 4 (advanced angle control) is performed. The advanced/delayed angle control will be explained.

Further, the controller 20 includes: a determination reference voltage circuit 41 that generates the determination reference voltage Vsref in order to generate a signal to be used for the short regulator unit 25 to determine the charged voltage of the battery 4 (the output voltage Vd as will be explained later); and a comparator (CMP) 42 that compares a feedback signal Vfb from the battery voltage Vbat and the determination reference voltage Vsref. Regarding the output voltage Vd of the comparator (CMP) 42, for example, "Vd='H (high level)'" when the battery voltage Vbat is low and "Vfb<Vsref". "Vd='L (low level)'" when the battery voltage Vbat is high and "Vfb>Vsref".

Then, when the output voltage Vd of the comparator 42 is "Vd='H (high level)'", the short regulator unit 25 collectively turns off the switching elements Q1 to Q6, and thus charges the battery 4 based on the AC output voltage of the motor 1 via the diodes Dx. Additionally, when the output voltage Vd of the comparator 42 is "Vd='L (low level)'", the short regulator unit 25 turns on the switching elements Q4, Q5, and Q6 on the lower arm (the switching elements Q1, Q2, and Q3 on the upper arm are off), and thus performs interphase short circuit of the AC output voltages of the motor 1.

Although the entire configuration of the brushless motor control apparatus 10 has been explained above, the brushless motor control apparatus 10 includes a microcomputer (or microcontroller). Additionally, the controller 20 in the brushless motor control apparatus 10, the number of engine rotations measurer 21, the zero-cross point estimator 22, and the conduction controller 23, which are included in the controller 20, and other circuits, may be implemented by a software process if the process functions of those elements can be implemented by the above microcomputer executing software programs. As a matter of course, those elements may be implemented by hardware.

Regarding the sub-coil Su provided in the three-phase brushless motor 1, explanations have been given above with respect to the case where the sub-coil Su is provided in parallel with the U-phase coil of the stator, and the U-phase inducing voltage Vsu is detected by that sub-coil Su, as shown in FIG. 1. However, the configuration is not limited thereto, and the sub-coil Su may be configured by a method shown in FIG. 15.

Figure 15:
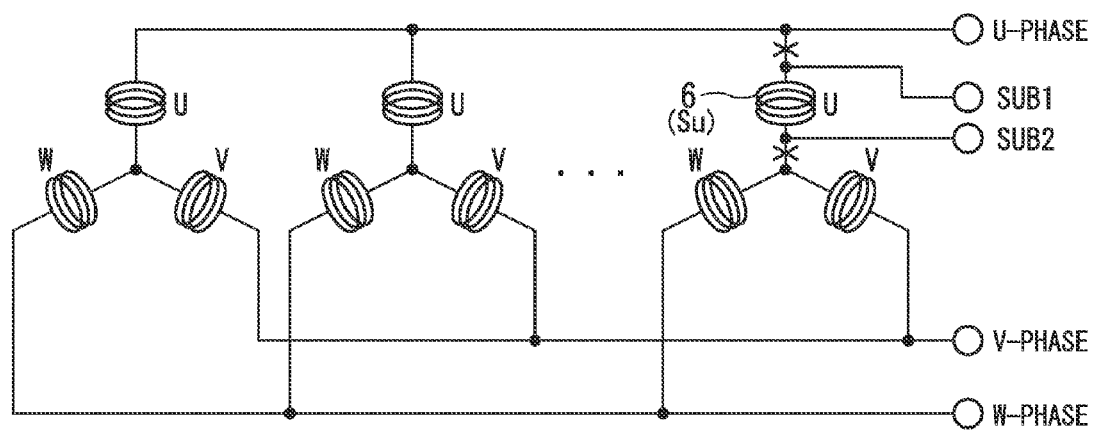
FIG. 15 is a diagram illustrating another example of a configuration of a sub-coil Su.

In the case of FIG. 15, the three-phase brushless motor having multiple poles (six poles in the shown example) on the stator side is used, the coil 6 of one pole associated with one of the phases (the U-phase in the shown example) is subject to floating, thus forming the sub-coil Su. In other words, the coil 6 of one of the six poles associated with the U-phase is removed (made be in a floating state), terminals SUB1 and SUB2 are drawn from the removed coil 6, and thus the U-phase voltage Vsu is obtained from the terminals SUB1 and SUB2.

(Explanation of Operation of Short Regulator Unit 25)

Figure 2A:
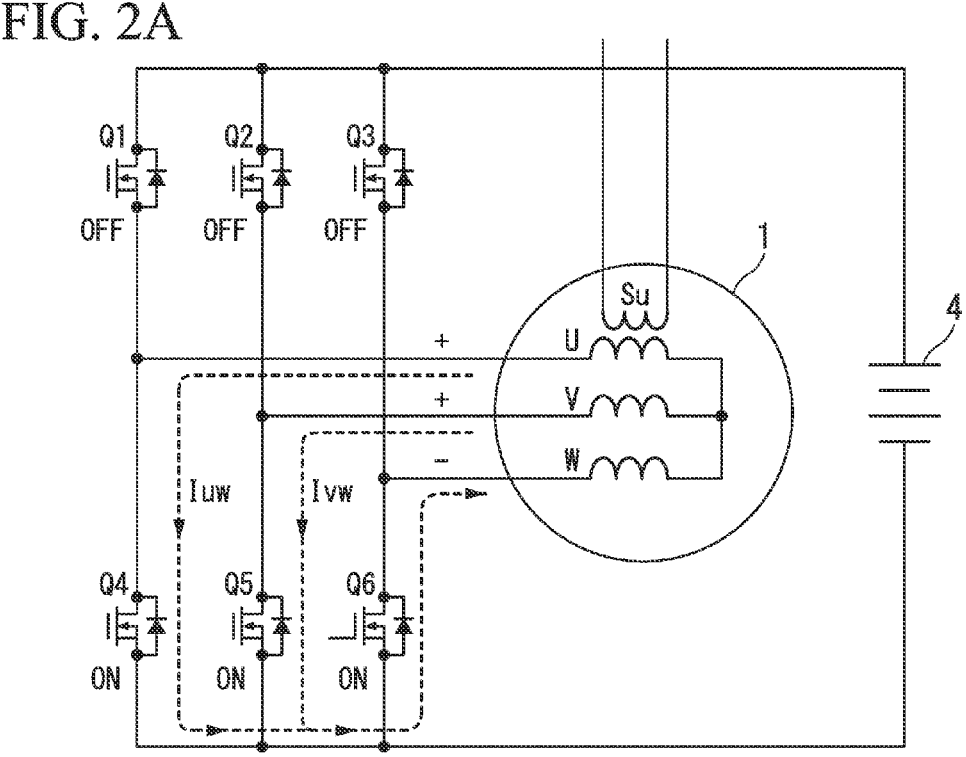
FIG. 2A is a diagram illustrating operation of a short regulator unit 25.
Figure 2B:
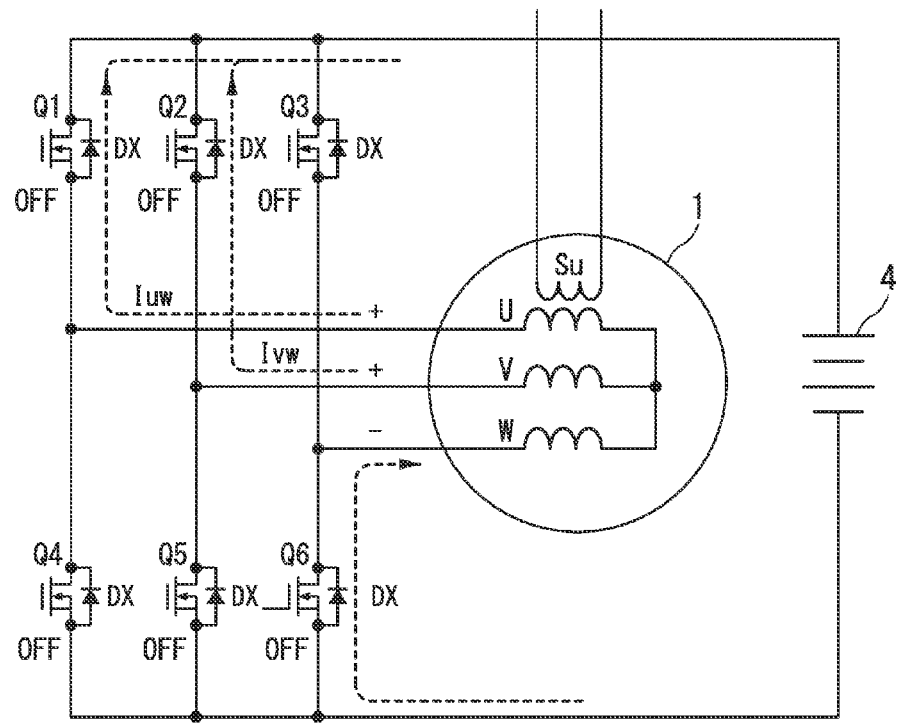
FIG. 2B is a diagram illustrating operation of the short regulator unit 25.

Then, operation of the short regulator unit 25 in the conduction controller 23 is explained. The conduction controller 23 selects the short regulator unit 25 when the number of rotation of the engine is smaller than or equal to the first number of rotations N1, and controls the three-phase brushless motor 1 using the short regulator unit 25. FIGS. 2A and 2B are diagrams illustrating control operation of the short regulator unit 25.

As shown in FIGS. 2A and 2B, when the number of rotations of the engine is smaller than the first number of rotations N1, according to the charged voltage of the battery 4, the short regulator unit 25 turns on the lower arm (switching elements Q4, Q5, and Q6) of the three-phase bridge circuit 14 to perform interphase short circuit of the motor coil terminals of the three-phase brushless motor 1, or collectively turns off the switching elements Q1 to Q6 to charge the battery 4 from the motor 1 via the diodes Dx in parallel with the respective switching elements Q1 to Q6.

FIG. 2A illustrates a case where the three-phase brushless motor 1 rotates at the number of rotations that is smaller than the first number of rotations N1, and the charged voltage of the battery 4 (more accurately, the feedback signal Vfb from the battery voltage Vbat) is higher than the determination reference voltage Vsref. In this case, all the switching elements Q1, Q2, and Q3 on the upper arm side of the three-phase bridge circuit 14 are turned off, and all the switching elements Q4, Q5, and Q6 on the lower arm side are turned on, thus performing interphase short circuit of the motor coil terminals of the U-phase, the V-phase, and the W-phase of the three-phase brushless motor 1.

For this reason, as shown in FIG. 2A, current Iuw and current Ivw flow in the direction indicated by arrows shown in the figure when the three-phase brushless motor 1 rotates at the number of rotations that is smaller than the first number of rotations N1, the positive voltage is induced to the U-phase coil terminal and the V-phase coil terminal, and the negative voltage is induced to the W-phase coil terminal. Thus, the currents output from the motor coil of the three-phase brushless motor 1 do not flow toward the battery 4 side, circulate in the motor coils of the three-phase brushless motor 1, and are consumed by internal resistors in the motor coils. Thus, the AC output voltage of the three-phase brushless motor 1 is prevented from being output to the battery 4 side when the number of rotations of the engine is smaller than or equal to the predetermined first number of rotations N1 and when the charged voltage of the battery 4 is greater than or equal to the determination reference voltage Vsref.

Here, the case where the switching elements Q1, Q2, and Q3 on the upper arm side are collectively turned off, and the switching elements Q4, Q5, and Q6 on the lower arm side are collectively turned on has been shown in FIG. 2A. Conversely, the configuration may be such that the switching elements Q1, Q2, and Q3 on the upper arm side are collectively turned on, and the switching elements Q4, Q5, and Q6 on the lower arm side are collectively turned off.

Additionally, FIG. 2B illustrates a case where the three-phase brushless motor 1 rotates at the number of rotations that is smaller than the first number of rotations N1, and the charged voltage of the battery 4 (more accurately, the feedback signal Vfb from the battery voltage Vbat) is lower than the determination reference voltage Vsref. In this case, all the switching elements Q1, Q2, and Q3 on the upper arm side of the three-phase bridge circuit 14 are turned off, and all the switching elements Q4, Q5, and Q6 on the lower arm side are turned off.

For this reason, as shown in FIG. 2B, the current Iuw and the current Ivw flow in the direction indicated by arrows shown in the figure when the three-phase brushless motor 1 rotates at the number of rotations that is smaller than the first number of rotations N1, the positive voltage is induced to the U-phase coil terminal and the V-phase coil terminal, and the negative voltage is induced to the W-phase coil terminal. Thus, the currents output from the motor coils of the three-phase brushless motor 1 flow toward the battery 4 side via the diodes Dx, thus charging the battery 4. Thus, the battery 4 can be charged by the AC output voltages of the three-phase brushless motor 1 when the number of rotations of the engine is smaller than or equal to the predetermined first number of rotations N1 and when the charged voltage of the battery 4 is smaller than the determination reference voltage Vsref.

(Explanation of Operation for Conduction Controller 23 to Select Regulator)

When the three-phase brushless motor 1 is rotary-driven by the engine 5 side as explained above, the three-phase brushless motor 1 serves as a three-phase AC power generator. When the three-phase brushless motor 1 serves as a three-phase AC power generator, the conduction controller 23 selects the phase control regulator unit 24 or the short regulator unit 25, thereby controlling the three-phase brushless motor 1.

In other words, when the number of rotations of the engine is greater than or equal to the first number of rotations N1, the conduction controller 23 controls the phase control regulator unit 24 to convert the three-phase AC output voltages Vu, Vv, and Vw output from the three-phase brushless motor 1 into the DC voltage (forward conversion), thus causing charging current to flow to the battery 4 based on that DC voltage. Additionally, when the number of rotations of the engine is smaller than the first number of rotations N1, the conduction controller 23 controls, according to the charged voltage of the battery 4, the short regulator unit 25 to perform interphase short circuit of the motor coil terminals of the three-phase brushless motor 1 or charge the battery 4 based on the AC output voltage of the three-phase brushless motor 1 via the diodes Dx on each arm of the three-phase bridge circuit 14.

FIG. 3 is a flowchart illustrating operation for the conduction controller 23 to select a regulator. Hereinafter, operation of switching between a regulator operation (REG operation) performed by the conduction controller 23 performing phase control and short regulator operation (short REG operation) performed by the short regulator 25 is explained with reference to this FIG. 3.

While the brushless motor control apparatus 10 is in operation, the conduction controller 23 determines whether or not the current control state (REG control) is the state of control by the short regulator unit 25 (short REG) (step S11). For example, the conduction controller 23 has a flag that can be set or reset, and detects data indicated by the flag in step S11. If the data 0 is set, the conduction controller 23 determines that the current control state is the state of control by the phase control regulator 24. If data 1 is set, the conduction controller 23 determines that the current control state is the state of control by the short regulator unit 25. Additionally, when the conduction controller 23 determines whether or not the number of rotations of the engine is greater than or equal to the first number of rotations N1 as will be explained later (steps S12 and S15), if the number of rotations of the engine is determined to be greater than or equal to the first number of rotations N1, the conduction controller 23 sets data 0 to the flag. If the number of rotations of the engine is determined to be smaller than the first number of rotations N1, the conduction controller 23 sets data 1 to the flag. Then, if the current control state is determined to be the state of phase control by the phase control regulator unit 24 (phase control REG) (step S11: No). Then, the conduction controller 23 receives information concerning the number of rotation of the engine from the number of engine rotations measurer 21, and determines whether or not the number of rotation of the engine is greater than or equal to the predetermined first number of rotations N1 (step S12).

Then, if the number of rotation of the engine is determined in step 12 to be smaller than the predetermined first number of rotations N1 (step S12: No), the conduction controller 23 changes the control state (REG control) from the state of control by the phase control regulator unit 24 (phase control REG) to the state of control by the short regulator unit 25 (short REG) (step S13). On the other hand, if the number of rotation of the engine is determined in step 12 to be greater than or equal to the predetermined first number of rotations N1 (step S12: Yes), the conduction controller 23 maintains the control state (REG control) that is the state of control by the phase control regulator unit 24 (phase control REG) (step S14).

Additionally, if the current control state (REG control) is determined in step S11 to be the state of control by the short regulator unit 25 (short REG) (step S11: Yes), then, the conduction controller 23 receives information concerning the number of rotations of the engine from the number of engine rotations measurer 21, and determines whether or not the number of rotation of the engine is greater than or equal to the predetermined first number of rotations N1 (step S15).

Then, if the number of rotation of the engine is determined in step 15 to be greater than or equal to the predetermined first number of rotations N1 (step S15: Yes), the conduction controller 23 changes the control state (REG control) from the state of control by the short regulator unit 25 (short REG) to the state of control by the phase control regulator unit 24 (phase control REG) (step S14). On the other hand, if the number of rotations of the engine is determined in step 15 to be smaller than the predetermined first number of rotations N1 (step S15: No), the conduction controller 23 maintains the control state (REG control) that is the state of control by the short regulator unit 25 (short REG) (step S16).

Figure 4:
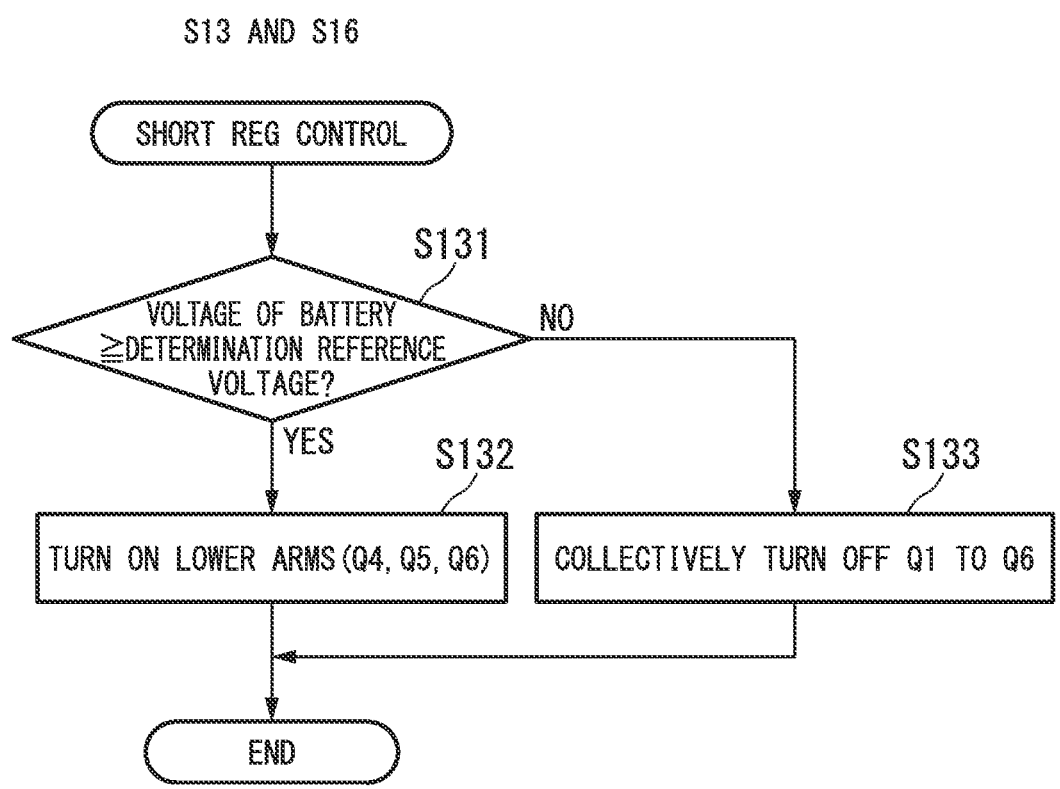
FIG. 4 is a flowchart illustrating short regulator control performed in steps S13 and S16 shown in FIG. 3.

Additionally, FIG. 4 is a diagram illustrating the short regulator control performed in steps S13 and S16 shown in FIG. 3. As shown in FIG. 4, if the number of rotations of the engine is smaller than or equal to N1, the short regulator unit 25 determines whether or not the charged voltage of the battery 4 is greater than or equal to the predetermined determination reference voltage (step S131). More specifically, the feedback signal Vfb from the battery voltage Vbat and the determination reference voltage Vsref are compared by the comparator (CMP) 42.

Then, if the charged voltage of the battery 4 is determined in step S131 to be greater than or equal to the predetermined determination reference voltage, the short regulator unit 25 turns on the switching elements Q4, Q5, and Q6 on the lower arm to perform interphase short circuit of the motor coil terminals of the three-phase brushless motor 1 (step S132).

On the other hand, if the charged voltage of the battery 4 is determined in step S131 not to be greater than or equal to the predetermined determination reference voltage, the short regulator unit 25 collectively turns off the switching elements Q1 to Q6 on both arms to charge the battery 4 based on the AC output voltages of the motor 1 via the diodes DX coupled in parallel to the respective switching elements Q1 to Q6 (step S133).

Thus, when the number of rotations of the engine is smaller than or equal to N1, the short regulator unit 25 can perform, according to the charged voltage of the battery 4, control to perform interphase short circuit of the AC output voltages of the motor 1 to prevent the AC output voltages from being output to the battery 4 side, or control to charge the battery 4 based on the AC output voltages of the motor 1.

According to the procedure indicated by the flowchart, the brushless motor control apparatus 10 calculates the number of rotations of the engine. If the number of rotations of the engine is smaller than the predetermined first number of rotations, before zero-cross points of the phase voltage (such as the phase voltage Vsu induced to the sub-coil Su) become unable to be detected, the brushless motor control apparatus 10 changes the control operation with respect to the three-phase brushless motor 1 from the operation of control by the phase control regulator to the operation of control by the short regulator. Then, if the number of rotations of the engine exceeds the predetermined first number of rotations, the brushless motor control apparatus 10 changes the control operation with respect to the three-phase brushless motor 1 to the operation of control by the phase control regulator again. Thus, the regulator control with respect to the three-phase brushless motor 1 can be performed even in situations other than the engine normal operation, such as engine stall, thereby preventing the excessive voltage from being applied to the external load.

(Explanation of Modified Example of Brushless Motor Control Apparatus 10)

Explanation has been given above with respect to the case where if the number of rotations of the engine is smaller than the predetermined first number of rotations N1, the above brushless motor control apparatus 10 changes the control operation with respect to the three-phase brushless motor 1 from the operation of control by the phase control regulator to the operation of control by the short regulator. Hereinafter, explanation is given with respect to a case where if the number of rotations of the engine is further lowered and becomes smaller than a predetermined second number of rotations N2 (N2<N1), the U-phase coil terminal, the V-phase coil terminal, and the W-phase coil terminal of the three-phase brushless motor 1 are collectively turned off (electrically turned off). Here, the second number of rotations N2 is the number of rotations such that each of the three-phase AC output voltages output from the three-phase AC power generator 1 does not become the voltage for charging, that is, does become the voltage not to be contributed to charging. For example, the second number of rotations N2 is the low number of rotations such as immediately before the engine is terminated. Here, the second number of rotations N2 is obtained by previously measuring the number of rotations of the engine when each of the three-phase AC output voltages output from the three-phase AC power generator 1 does not become contributing to charging, that is, does become the voltage not to be contributed to charging.

Figure 5:
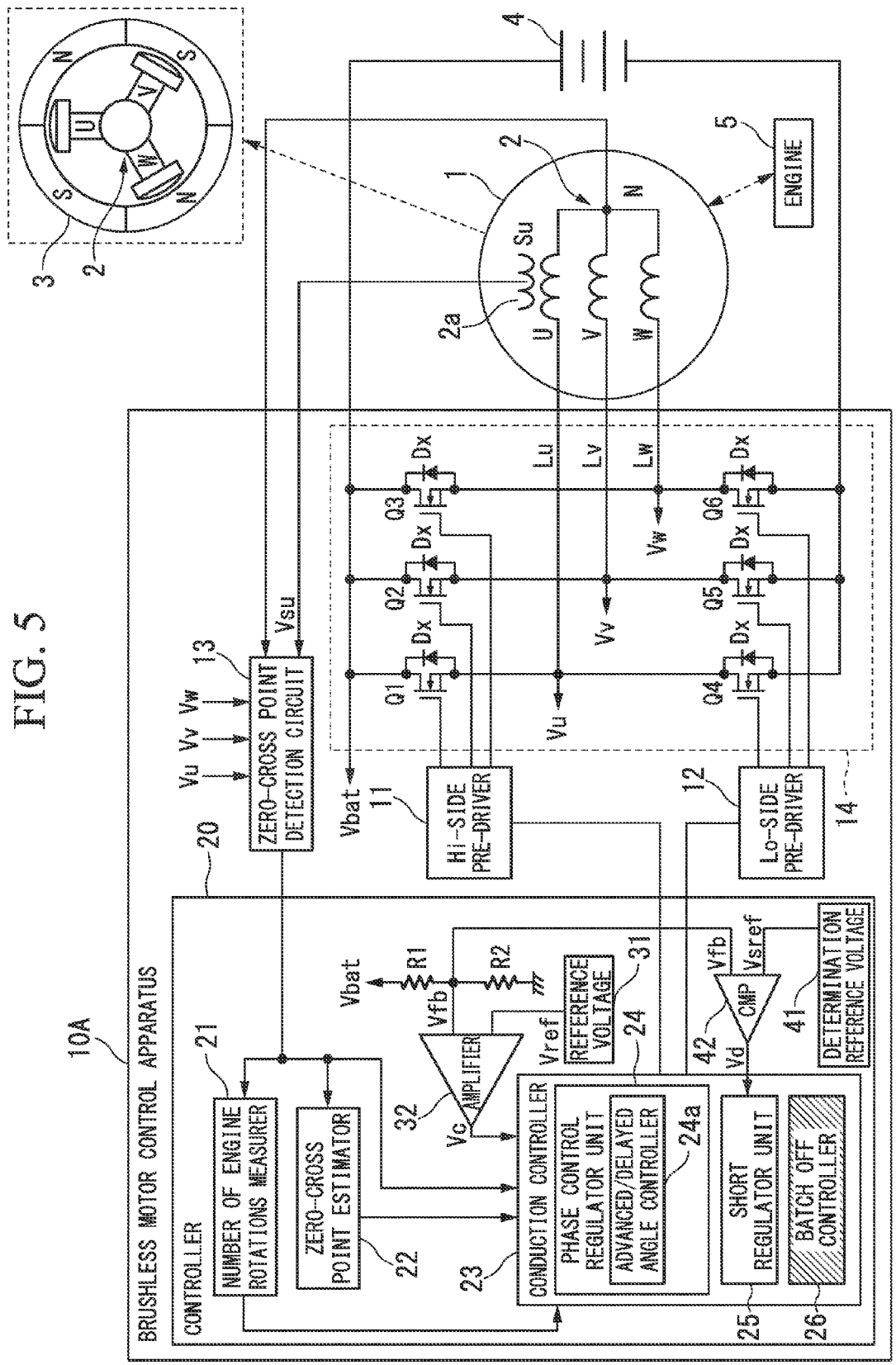
FIG. 5 is a diagram illustrating a configuration of a brushless motor control apparatus having a batch off function.

FIG. 5 is a diagram illustrating a configuration of the brushless motor control apparatus having a batch off function. A brushless motor control apparatus 10A shown in FIG. 5 differs from the brushless motor control apparatus 10 shown in FIG. 1 in that a batch off controller 26 is newly added. Other configurations are the same as those of the brushless motor control apparatus 10 shown in FIG. 1. For this reason, like reference numerals are appended to like constituent elements, and explanations thereof are omitted here.

When the number of rotations of the engine is smaller than or equal to the predetermined second number of rotations N2 (N2<N1), the batch off controller 26 electrically disconnect the brushless motor control apparatus 10A from the U-phase motor coil, the V-phase motor coil, and the W-phase motor coil of the three-phase brushless motor 1.

Figure 6:
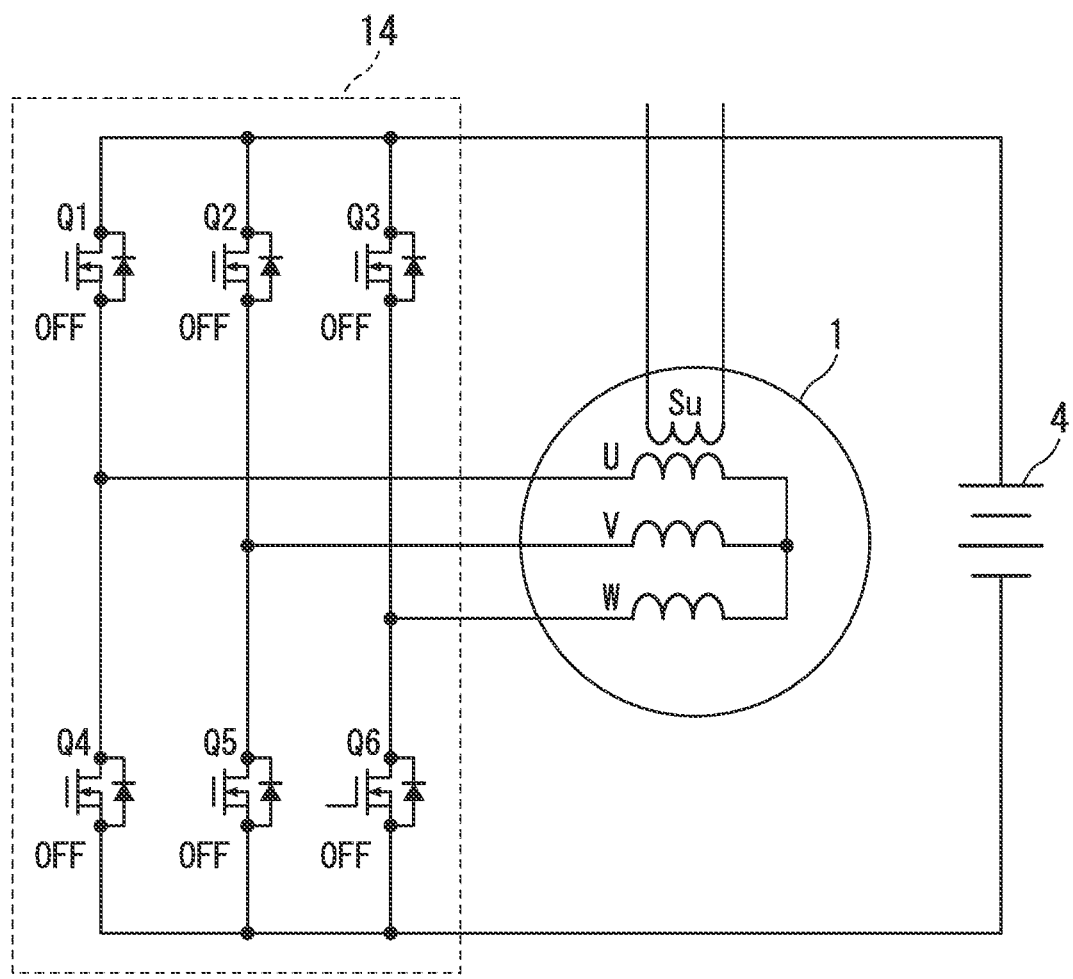
FIG. 6 is a diagram illustrating operation of a batch off controller 26.

FIG. 6 is a diagram illustrating operation of the batch off controller 26. As shown in FIG. 6, the batch off controller 26 turns off all the switching elements Q1, Q2, and Q3 on the upper arm side of the three-phase bridge circuit 14, and also turns off all the switching elements Q4, Q5, and Q6 on the lower arm side. Thus, the U-phase motor coil, the V-phase motor coil, and the W-phase motor coil are electrically disconnected from the three-phase bridge circuit 14 (but, are still coupled to the battery 4 via the diodes Dx coupled in parallel to the switching elements Q1 to Q6). Thus, a rectification circuit (three-phase rectification circuit) including the diodes Dx is formed. In other words, the three-phase brushless motor 1 becomes in the free-run state of not being controlled by the brushless motor control apparatus 10A.

Here, FIG. 6 does not differ from the above shown FIG. 2B in that all the switching elements Q1, Q2, and Q3 on the upper arm side are turned off, and all the switching elements Q4, Q5, and Q6 on the lower arm side are also turned off. FIG. 2B includes the case where the number of rotations of the engine is greater than or equal to N2. In this case where the number of rotations of the engine is greater than or equal to N2, it is possible to charge the battery 4 using the AC output voltages of the motor 1. On the other hand, FIG. 6 shows the state in which the number of rotations of the engine is smaller than or equal to N2, which is the state in which the engine almost stops or immediately before that state, and which is the state in which the battery 4 cannot be charged using the AC output voltages of the motor 1.

Figure 7A:
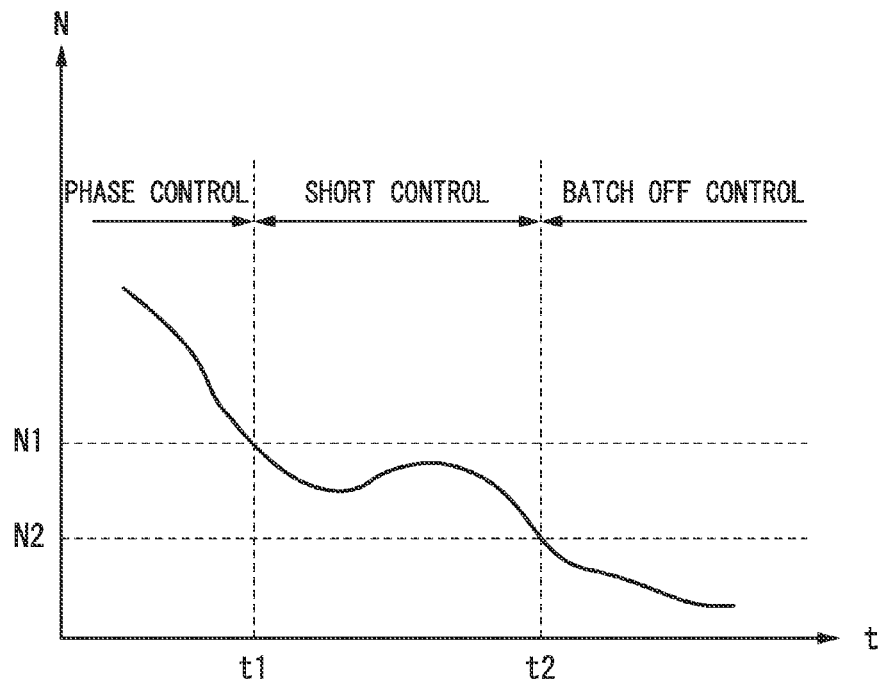
FIG. 7A is a diagram illustrating an example of the number of rotations of an engine and a change of the control state of the brushless motor control apparatus 10A shown in FIG. 5.
Figure 7B:
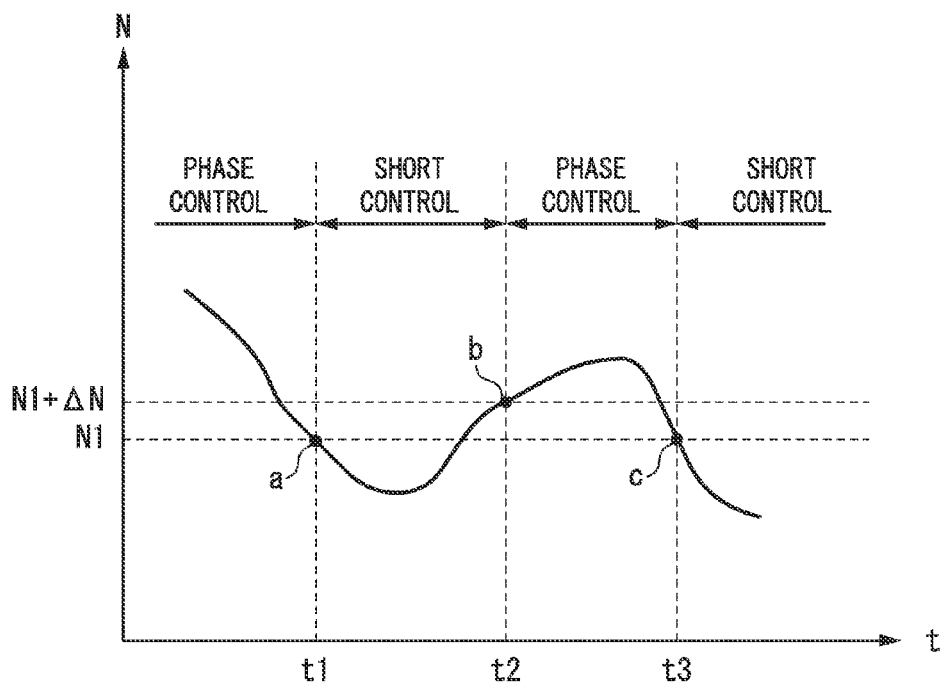
FIG. 7B is a diagram illustrating an example of the number of rotations of the engine and a change of the control state of the brushless motor control apparatus 10A shown in FIG. 5.

FIGS. 7A and 7B illustrate examples of the number of rotations of the engine and a change of the control state. As shown in FIG. 7A, in a case where the number of rotations of the engine N varies as time t elapses, in the region prior to time t1 where the number of rotations of the engine is greater than or equal to the first number of rotations N1, the phase control regulator unit 24 performs phase control of the AC output voltages Vu, Vv, and Vw. Additionally, in the region between time t1 and time t2 where the number of rotations of the engine is smaller than or equal to the first number of rotations N1, and is greater than or equal to the second number of rotations N2, the short regulator unit 25 performs short regulator control. Further, in the region after time t2 where the number of rotations of the engine is smaller than or equal to the second number of rotations N2, the batch off controller 26 performs batch off control.

Additionally, when the control state is changed between the phase control regulator unit 24 and the short regulator unit 25 and between the short regulator unit 25 and the batch off controller 26, the conduction controller 23 can change the control state while maintaining the hysteresis characteristic. For example, as shown in FIG. 7B, when the control state is changed from the operation by the phase control regulator to the operation by the short regulator, as indicated by the point a at time t1, the first number of rotations N1, which is the number of rotations of the engine, is used as a value for determining whether to change the number of rotations of the engine.

Additionally, when the control state is changed from the operation by the short regulator to the operation by the phase control regulator, as indicated by the point b at time t2, the number of rotations of the engine "N1+ΔN (ΔN>0)" is used as the value for determining whether to change the number of rotations of the engine. Further, when the control state is changed from the operation by the phase control regulator to the operation by the short regulator, as indicated by the point c at time t3, the first number of rotations N1, which is the number of rotations of the engine, is used again as the value for determining whether to change the number of rotations of the engine. Even when the control state is changed between the operation by the short regulator and the batch off control, the conduction controller 23 can similarly change the control state while maintaining the hysteresis characteristic.

Thus, for example, it is possible to prevent the change between the operation by the phase control regulator and the operation by the short regulator from frequently occurring in a case where the number of rotations of the engine stays around the first number of rotations N1.

Figure 8:
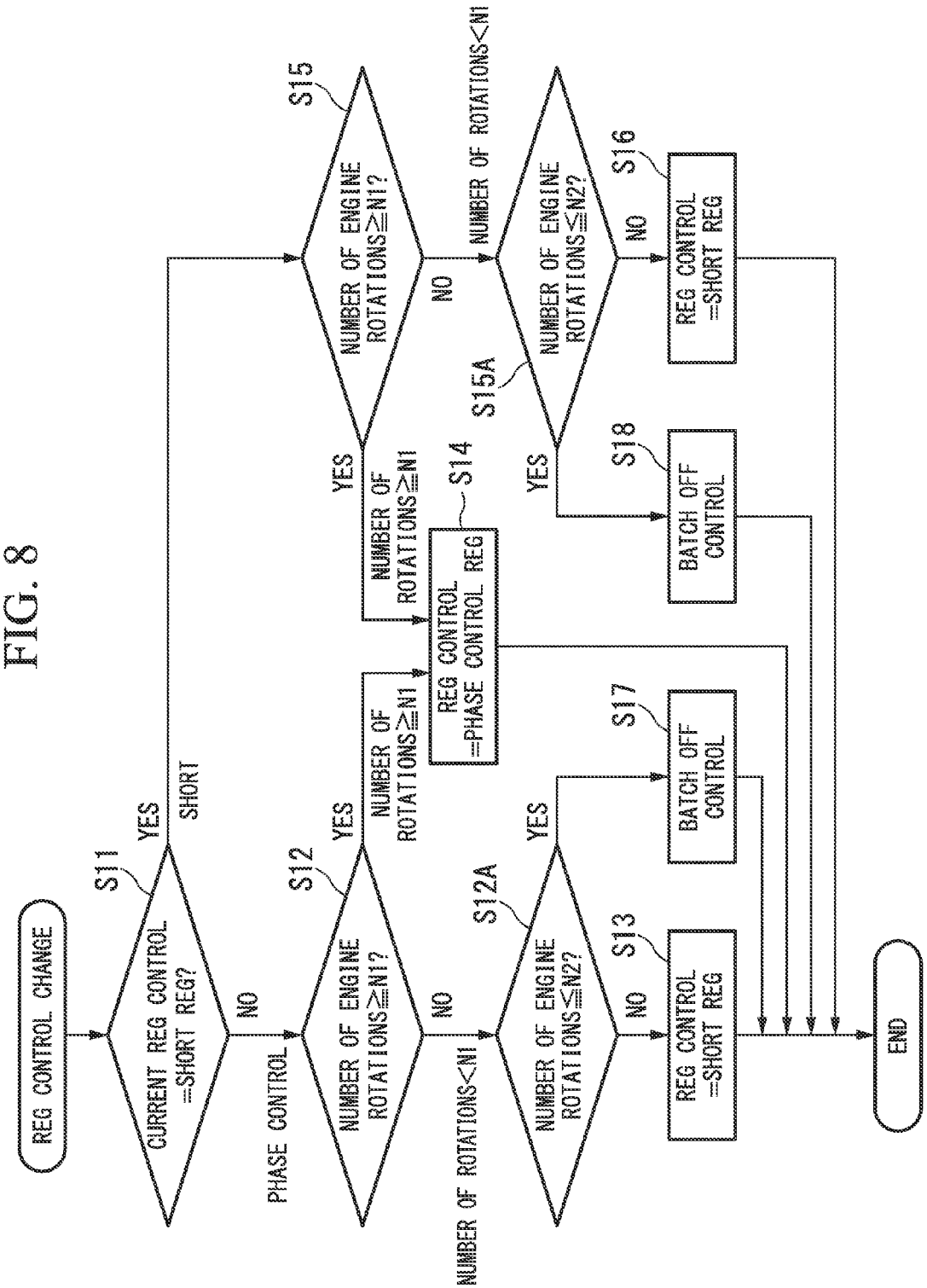
FIG. 8 is a flowchart illustrating operation for the brushless motor control apparatus 10A shown in FIG. 5 to select a regulator.

Additionally, FIG. 8 is a flowchart illustrating operation for the brushless motor control apparatus 10A shown in FIG. 5 to select a regulator. The flowchart shown in FIG. 8 differs from the flowchart shown in FIG. 3 in that steps S12A, S17, S15A, and S18 are newly added. Other processes are the same as in the flowchart shown in FIG. 3. For this reason, like reference numerals are appended to like processes, and overlapping explanations are omitted here.

In FIG. 8, the added steps S12A, S17, S15A, and S18 are steps for the batch off controller 26 to electrically disconnect the motor coils of the three-phase brushless motor 1 when the number of rotations of the engine is smaller than or equal to the second number of rotations N2.

In other words, in the added step S12A, when the number of rotations of the engine is determined in step S12 to be smaller than the first number of rotations N1 (step S12: No), the conduction controller 23 further determines whether or not the number of rotations of the engine is smaller than or equal to the second number of rotations N2 (step S12A). Then, if the number of rotations of the engine is determined to be smaller than or equal to the second number of rotations N2 (step S12A: Yes), the conduction controller 23 selects the batch off controller 26 and turns off all the switching elements Q1 to Q6 in the three-phase bridge circuit 14 (step S17). On the other hand, if the number of rotations of the engine is determined not to be smaller than or equal to the second number of rotations N2 (step S12A: No), the operation proceeds to step S13, and the conduction controller 23 changes the state of control by the phase control regulator unit 24 to the state of control by the short regulator unit 25 (step S13).

Additionally, if the number of rotations of the engine is determined to be smaller than the first number of rotations N1 (step S15: No), the conduction controller 23 further determines in the added step S15A whether or not the number of rotations of the engine is smaller than or equal to the second number of rotations N2 (step S15A). Then, if the number of rotations of the engine is determined to be smaller than or equal to the second number of rotations N2 (step S15A: Yes), the conduction controller 23 selects the batch off controller 26 and turns off all the switching elements Q1 to Q6 in the three-phase bridge circuit 14 (step S18). On the other hand, if the number of rotations of the engine is determined in step S15A not to be smaller than or equal to the second number of rotations N2 (step S15A: Yes), the operation proceeds to step S16 and the conduction controller 23 maintains the state of control by the short regulator unit 25 (step S16).

In the aforementioned brushless motor control apparatuses 10 and 10A, when the number of rotations of the engine is greater than or equal to the first number of rotations N1, the phase control regulator unit 24 performs phase control of the AC output voltages Vu, Vv, and Vw of the three-phase brushless motor 1, thus charging the battery 4. The phase control regulator unit 24 estimates the phases of the AC output voltages Vu, Vv, and Vw of the three-phase brushless motor 1 based on the zero-cross points estimated by the zero-cross point estimator 22. Then, the phase control regulator unit 24 rectifies and phase-controls the AC output voltages Vu, Vv, and Vw, thereby controlling the battery 4. Before operation of the phase control regulator unit 24 is explained, operation for the zero-cross point estimator 22 to estimate zero-cross points (operation of estimating phases of the AC output voltages Vu, Vv, and Vw) is explained.

(Explanation of Operation of Zero-Cross Point Estimator 22)

Figure 9A:
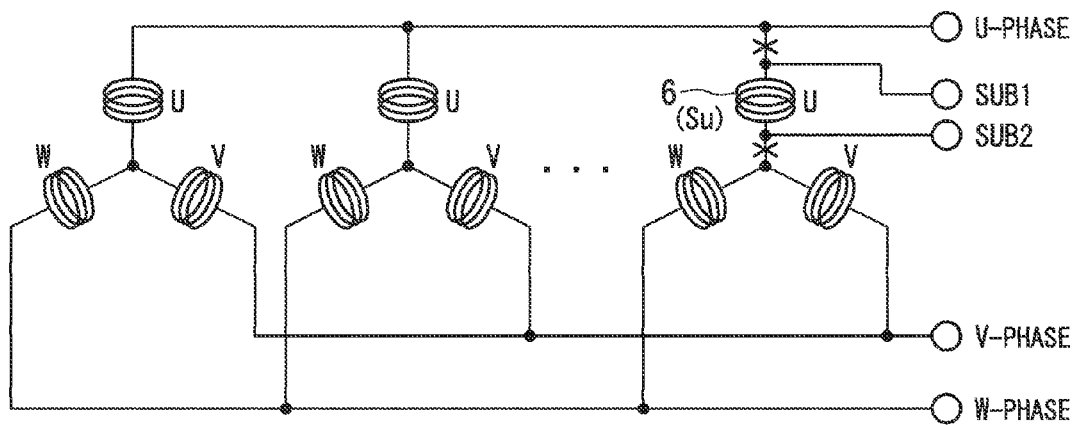
FIG. 9A is a diagram illustrating operation of a zero-cross point estimator 22.
Figure 9B:
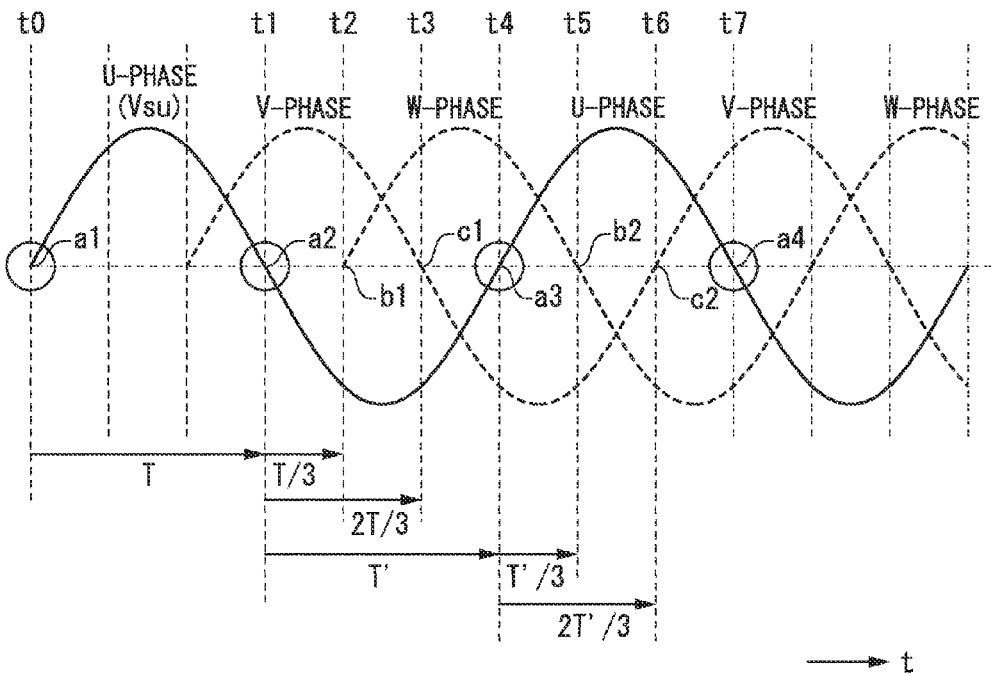
FIG. 9B is a diagram illustrating operation of the zero-cross point estimator 22.

FIGS. 9A and 9b are diagrams illustrating the operation of the zero-cross point estimator 22. FIG. 9A shows an example where a coil 6 of one polar of the U-phase coil is detached from the other coils and is made in the floating state, and the coil 6 in that floating state is regarded as the sub-coil Su. FIG. 9A is the same as shown in FIG. 15.

Additionally, FIG. 9B is a diagram illustrating the voltage (the U-phase voltage) Vsu induced to the sub-coil Su, the zero-cross points of that voltage Vsu, and the zero-cross points of the estimated V-phase and W-phase voltages, and V-phase and W-phase waveforms having those estimated zero-cross points (virtual V-phase and W-phase induced voltage waveforms which are indicated by the dashed lines and which are not actually detected), where a horizontal direction denotes time t and a vertical direction denotes a value of the voltage.

Based on the detection signals at the zero-cross points of the output voltage Vsu of the sub-coil Su detected by the zero-cross point detection circuit 13, the zero-cross point estimator 22 detects the phase of the phase voltage of the U-phase (phase of the voltage Vsu induced to the sub-coil Su), and calculates the time interval T between two adjacent zero-cross points. More specifically, as shown in FIG. 9B, the time interval T (=t1−t0) between two adjacent zero-cross points is calculated based on the zero-cross point a1 at time t0 and the zero-cross point a2 at time t1, which are the zero-cross points of the voltage Vsu induced to the sub-coil Su.

Then, based on the time interval T between the adjacent zero-cross points a1 and a2 (180° interval), the zero-cross point estimator 22 calculates the intervals ⅓T and ⅔T by dividing the time interval T into three (divide by phase 60°). The interval "⅓T" calculated by the zero-cross point estimator 22 corresponds to the interval from time t1 at which the U-phase zero-cross point a2 occurs to time t2 at which the zero-cross point b1 of the W-phase voltage occurs. Similarly, the interval "⅔T" calculated by the zero-cross point estimator 22 corresponds to the interval from time t1 at which the U-phase zero-cross point a2 occurs to time t3 at which the zero-cross point c1 of the V-phase voltage occurs.

In other words, generally, the rotation speed of the three-phase brushless motor 1 does not vary significantly. Therefore, the waveform of the output voltage (AC voltage) Vsu of the sub-coil Su in the current cycle can be considered to be similar to that in the previous cycle. For this reason, the zero-cross point estimator 22 can estimate zero-cross points of the W-phase and the V-phase which occur the next, based on the time interval T between adjacent zero-cross points of the output voltage Vsu of the sub-coil Su. The zero-cross point occurs when the position of the coil of each phase matches the middle point of the magnetic poles of the rotor (the boundary point of the N and S poles). Those zero-cross points are estimated, and thereby the phases of the AC output voltages Vu, Vv, and Vw (the positions of the rotor) can be estimated.

Then, when a zero-cross point a3 of the output voltage Vsu of the sub-coil Su occurs at time t4, the zero-cross point estimator 22 measures a time interval T' between the adjacent zero-cross points a2 and a3. Based on the time interval T', the zero-cross point estimator 22 calculates time intervals "⅓T'" and "⅔T'" again. As shown in FIG. 9B, the interval "⅓T'" calculated by the zero-cross point estimator 22 corresponds to the interval from time t4 at which the zero-cross point a3 of the U-phase occurs to time t5 at which the zero-cross point b2 of the W-phase voltage occurs. Similarly, the interval "⅔T'" calculated by the zero-cross point estimator 22 corresponds to the interval from time t4 at which the zero-cross point a3 of the U-phase occurs to time t6 at which the zero-cross point c2 of the V-phase voltage occurs. Thereafter, the zero-cross point estimator 22 repeats measurement of the time interval T of the zero-cross points of the output voltage of the sub-coil Su and the process of estimating the zero-cross points of the W-phase and the V-phase by calculating the time intervals ⅓T and ⅔T.

Figure 10:
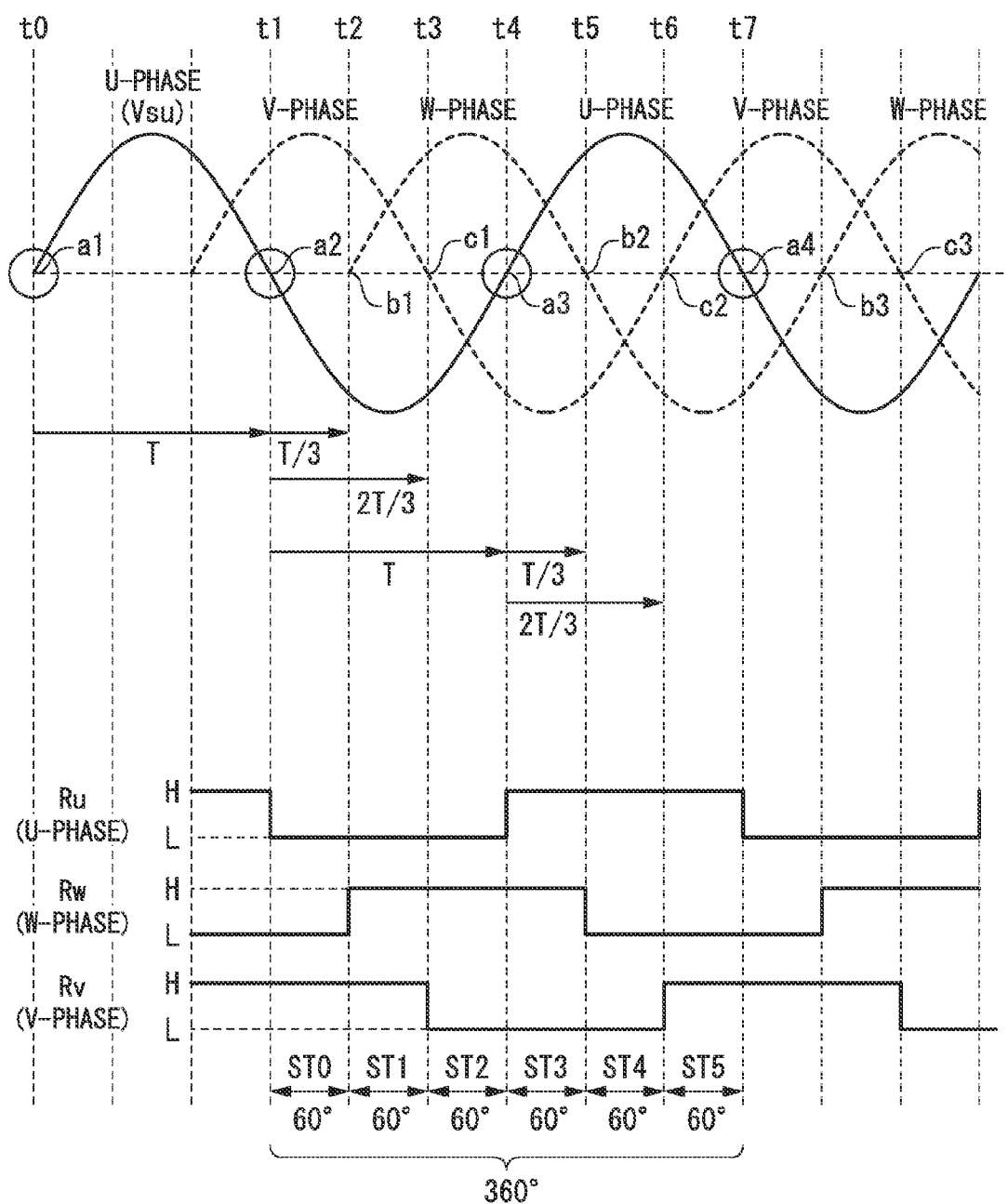
FIG. 10 is a diagram illustrating a method of estimating the position of the rotor (phase of the AC output voltage) based on zero-cross point estimation.

FIG. 10 is a diagram illustrating a method of estimating the position of the rotor (phase of the AC output voltage) by estimating zero-cross points. FIG. 10 shows the output voltage Vsu of the sub-coil Su, the zero-cross points of that voltage Vsu, and the estimated zero-cross points of the V-phase and W-phase, and V-phase and W-phase waveforms having those estimated zero-cross points (virtual induced voltage waveforms of the V-phase and the W-phase which are indicated by the dashed lines and which are not actually detected), where a horizontal direction denotes time t and a vertical direction denotes a value of the voltage. Additionally, FIG. 10 shows waveforms (rotor position detection waveforms) including a rectangular wave Ru synchronized with the U-phase, a rectangular wave Rw synchronized with the W-phase, and a rectangular wave Rv synchronized with the V-phase, which are generated based on the zero-cross points and arranged in the vertical direction. Here, the rectangular waves Ru, Rv, and Rw of the U-phase, the V-phase, and the W-phase shown in FIG. 10 are generated by the conduction control unit 23 (or the zero-cross point estimator 22) based on the zero-cross points of the voltage Vsu and the estimated zero-cross points of the V-phase and the W-phase.

As shown in FIG. 10, the rectangular wave Ru of the U-phase has a waveform that inverts in level at each zero-cross point (such as a2, a3, and a4) of the waveform of the U-phase voltage (more accurately, the waveform of the output voltage of the sub-coil Su). The rectangular wave Ru of the U-phase changes from H-level (high level) to the L-level (low level) at the zero-cross point a2. The rectangular wave Ru of the U-phase changes from L-level to H-level at the zero-cross point a3. The rectangular wave Ru of the U-phase changes from H-level to L-level at the zero-cross point a4.

Additionally, the rectangular wave Rw of the W-phase has a waveform that inverts in level at each zero-cross point (such as b1, a2, and a3) of the waveform of the W-phase voltage (virtual waveform of the voltage which is not actually detected). The rectangular wave Rw of the W-phase changes from L-level to the H-level at the zero-cross point b1. The rectangular wave Rw of the U-phase changes from H-level to L-level at the zero-cross point b2. The rectangular wave Rw of the W-phase changes from L-level to H-level at the zero-cross point b3. Further, the rectangular wave Rv of the V-phase has a waveform that inverts in level at each zero-cross point (such as c1, c2, and c3) of the waveform of the V-phase voltage (virtual waveform of the voltage which is not actually detected). The rectangular wave Rv of the V-phase changes from H-level to the L-level at the zero-cross point c1. The rectangular wave Rv of the V-phase changes from L-level to H-level at the zero-cross point c2. The rectangular wave Rv of the V-phase changes from H-level to L-level at the zero-cross point c3.

Accordingly, the zero-cross points of each phase correspond to the points at which the middle point of the magnetic poles of the rotor (boundary point of N and S poles) passes. Therefore, it is possible to detect rotor position information by detecting the zero-cross points from the H-level or L-level states of the rectangular waveforms Ru, Rv, and Rw respectively synchronized with the W-phase, the U-phase, and the V-phase shown in FIG. 10. For example, it is possible to detect six segments 0 to 5 for every 60 degrees, as shown in FIG. 10. For example, in one-rotation cycle from time t1 to time t7 (360° interval of the U-phase), it is possible to detect the positions of the rotor for every 60° (phases of the AC output voltages Vu, Vv, and Vw) in the six segments which are: the zero stage ST0 from time t1 to time t2; the first stage ST1 from time t2 to time t3; the second stage ST2 from time t3 to time t4; the third stage ST3 from time t4 to time t5; the fourth stage ST4 from time t5 to time t6; and the fifth stage ST5 from time t6 to time t7.

(Explanation of Operation of Phase Control Regulator Unit 24)

Next, explanation is given with respect to the phase control regulator operation performed by the phase control regulator unit 24 based on signals of the zero-cross points of the U-phase, the V-phase, and the W-phase (estimated phases of the AC output voltages Vu, Vv, and Vw) detected by the aforementioned zero-cross point estimator 22. In the phase control operation, the brushless motor control apparatuses 10 and 10A perform advanced/delayed angle control that controls the amount of power generated by the three-phase brushless motor 1, in order to efficiently charge the battery 4. Here, an advanced/delayed angle control method is a generally known method, and is not directly related to the present invention. For this reason, brief explanation is given herewith respect to the advanced angle/delayed angle control performed by the phase control regulator unit 24.

In a case where the three-phase brushless motor 1 is rotary-driven by the engine side, the three-phase brushless motor 1 serves as a three-phase AC power generator. In this case where the three-phase brushless motor 1 serves as a three-phase AC power generator, the brushless motor control apparatus operates so as to convert the three-phase AC output voltage output from the three-phase brushless motor 1 into the DC voltage (forward conversion), and thus cause the charging current to flow to the battery 4 based on the DC voltage. In this case, the brushless motor control apparatuses 10 and 10A perform advanced/delayed angle control that controls the amount of power generated by the three-phase brushless motor 1, in order to efficiently charge the battery 4.

Figure 11:
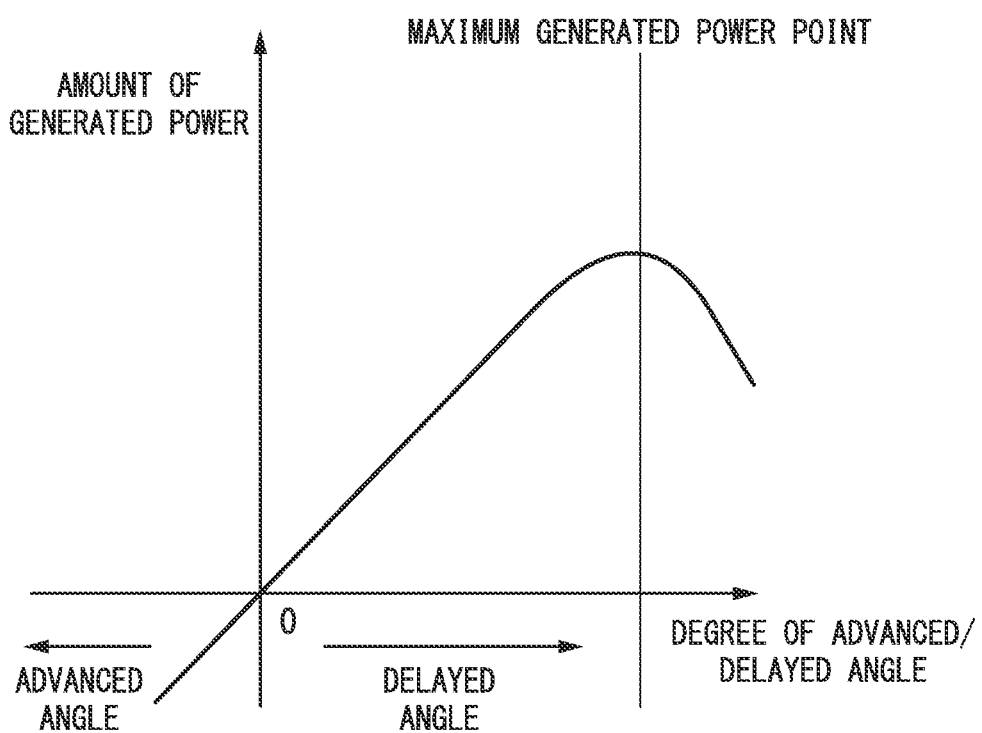
FIG. 11 is a diagram illustrating advanced/delayed angle control.

As shown in FIG. 11, the advanced/delayed angle control is a control of shifting the conduction timing for the switching elements Q1 to Q6 included in the rectification unit in the brushless motor control apparatus toward the advanced angle side or the delayed angle side, thereby controlling the amount of power generated by the three-phase brushless motor 1. Regarding the advanced/delayed angle control, when the voltage of the battery 4 is lower than the reference voltage, thus requiring charging of the battery, the brushless motor control apparatus is subjected to the delayed angle control to enter the battery charging state. When the voltage of the battery 4 is higher than the reference voltage, thus requiring no charging, the brushless motor control apparatus is subjected to the advanced angle control to enter the state of discharging the energy from the battery to the three-phase brushless motor 1.

The phase control regulator 24 estimates the phases of the AC output voltages Vu, Vv, and Vw based on the zero-cross points of the phase voltage Vsu (U-phase) output from the zero-cross point estimator 22 and the estimated zero-cross points of the other two phases (the V-phase and the W-phase). Then, the phase control regulator 24 determines the advanced/delayed angle based on the estimated phases of the AC output voltages Vu, Vv, and Vw and the output Vc of the difference amplifier 32. Then, the phase control regulator 24 rectifies and phase-controls the AC output voltages Vu, Vv, and Vw, thus charging the battery 4. Here, the estimation of the phases of the AC output voltages Vu, Vv, and Vw based on the zero-cross points may be performed by the zero-cross point estimator 22.

When the advanced/delayed angle control is performed, the difference amplifier 32 in the controller 20 compares the feedback signal Vfb from the actual battery voltage Vbat and the set value (target value) Vref of the battery charging voltage, amplifies a signal of the difference therebetween, and outputs the amplified signal as an output Vc of the difference amplifier. Here, the output Vc of the difference amplifier is "Vc>0" when the voltage of the battery Vbat is low and "Vfb<Vref". The output Vc of the difference amplifier is "Vc<0" when the voltage of the battery Vbat is high and "Vfb>Vref". When "Vc>0", charging of the battery 4 (delayed angle control) is performed. When "Vc<0", discharging of the battery 4 (advanced angel control) is performed.

The advanced/delayed angle controller 24a in the phase control regulator unit 24 receives the signal of the output Vc of the difference amplifier from the output Vc of the difference amplifier, determines the advanced/delayed angle, generates on/off signals for the switching elements Q1 to Q6 according to the advanced/delayed angle, and outputs the on/off signals to the Hi-side pre-driver circuit 11 and the Lo-side pre-driver circuit 12.

In the brushless motor control apparatuses 10 and 10A having such the configurations, the zero-cross point detection circuit 13 detects any one of the phases of the three-phase AC power generator, for example, the aforementioned zero-cross points of the output voltage Vsu of the U-phase sub-coil Su. Then, the zero-cross point estimator 22 estimates the zero-cross points of the two other phases (the V-phase and the W-phase). Then, the phases of the AC output voltages Vu, Vv, and Vw of the three phases of the three-phase brushless motor 1 are estimated based on the zero-cross points of the voltage (U-phase voltage) Vsu induced to the sub-coil Su and the zero-cross points of the two other phases (the V-phase, the W-phase) estimated by the zero-cross point estimator 22.

Then, based on the output voltage Vc of the difference amplifier 32, the phase control regulator unit 24 determines the advance/delayed angle with respect to the estimated phases of the AC output voltages Vu, Vv, and Vw of the three-brushless motor 1. Thus, the advance/delayed angle controller 24a controls the conduction timing for the switching elements Q1 to Q6 toward the advanced angle side or the delayed angle side.

(Explanation in Case where Brushless Motor Control Apparatus Operates as Motor Driver)

Next, explanation is given with respect to a case where the three-phase brushless motor 1 operates as a starter motor of the engine 5, and the brushless motor control apparatus rotary-drives that starter motor.

Figure 12:
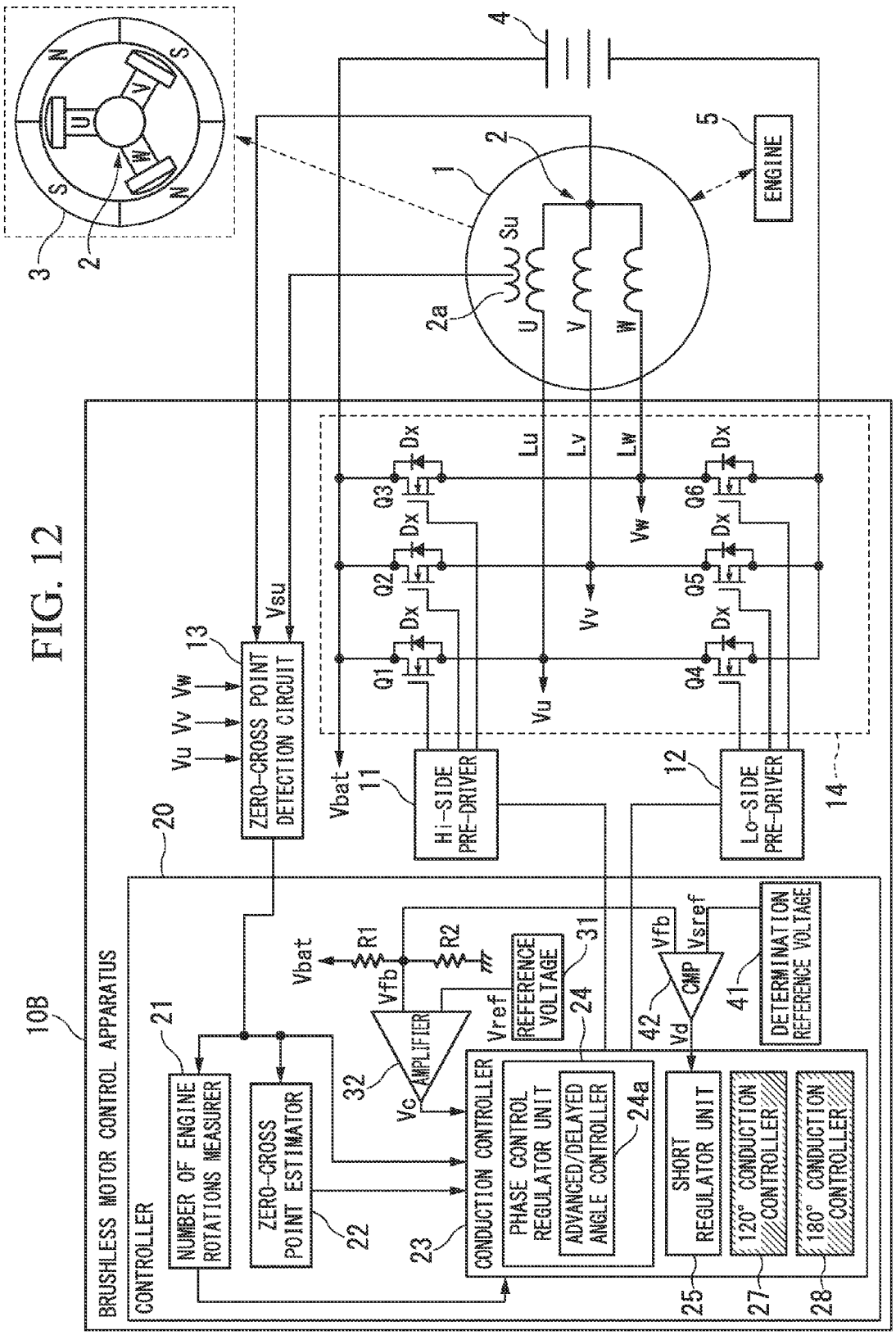
FIG. 12 is a diagram illustrating a configuration of a brushless motor control apparatus that operates as a battery charging device and a motor driving device.

FIG. 12 is a diagram illustrating a configuration in a case where the brushless motor control apparatus operates as a motor driving device as well as a battery charging device. A brushless motor control apparatus 10B shown in FIG. 12 differs from the brushless motor control apparatus 10 shown in FIG. 1 in that a 120° conduction controller 27 and a 180° conduction controller 28 are newly added. Other configurations are similar to those of the brushless motor control apparatus 10 shown in FIG. 1. For this reason, like reference numerals are appended to like constituent elements, and overlapping explanations are omitted here.

Similar to the brushless motor control apparatus 10 shown in FIG. 1, in a case where the three-phase brushless motor is rotary-driven by the engine 5 side and operates as a three-phase AC power generator, the brushless motor control apparatus 10B shown in FIG. 12 operates as a charging device that controls the phase control regulator unit 24 to charge the battery 4. Additionally, in a case where the three-phase brushless motor 1 operates as a starter motor of the engine 5, the brushless motor control apparatus 10B operates as a driving device that drives the starter motor.

In FIG. 12, the 120° conduction controller 27 performs 120° conduction to control the three-phase brushless motor 1. The 180° conduction controller 28 performs 120° conduction to control the three-phase brushless motor 1. Those 120° conduction control method and 180° conduction control method are not directly related to the present invention and also generally known methods. Therefore, the 120° conduction and the 180° conduction are briefly explained below.

(Explanation of 120° Conduction)

When the three-phase brushless motor 1 rotates at the low number of rotations, for example, the 120° conduction controller 27 can drive-control the three-phase brushless motor 1 by the 120° conduction method.

Figure 13:
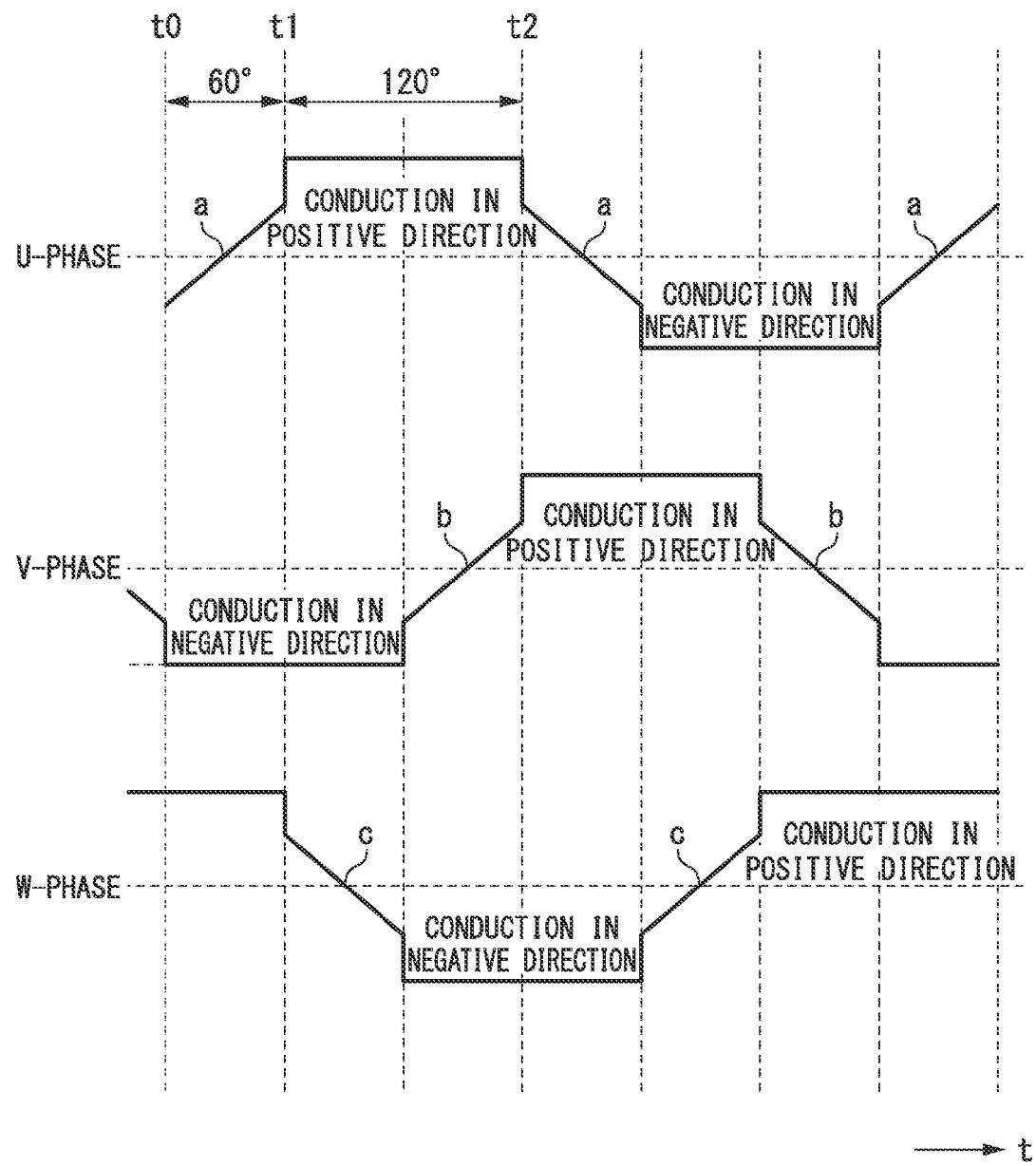
FIG. 13 is a diagram illustrating control operation of a 120° conduction controller 27.

FIG. 13 is a diagram illustrating the 120° conduction. FIG. 13 shows the waveform of the voltage of the U-phase coil terminal, the waveform of the voltage of the V-phase coil terminal, and the waveform of the voltage of the W-phase coil terminal, which are arranged in a vertical direction, where a horizontal direction denotes time t. In the voltage waveforms shown in FIG. 13, when the U-phase coil is conducted in the positive direction, the DC voltage on the positive side is applied from the battery 4 to the U-phase coil. When the U-phase coil is conducted in the negative direction, the DC voltage on the negative side is applied from the battery 4 to the U-phase coil (the similar applies to the V-phase and the W-phase).

Regarding the 120° conduction, the coil is conducted only for the 120° interval among all the 180° intervals, as shown in the voltage waveforms of the U-phase, the V-phase, and the W-phase shown in FIG. 13. Accordingly, the non-conductive phase occurs to each of the U-phase, the V-phase, and the W-phase. Thus, the position of the rotor can be detected by detecting the zero-cross points a, b, and c of the non-conductive phase.

For example, the U-phase coil is the non-conductive phase from time t0 to time t1 (60° interval) and is the conductive phase from time t1 to time t2 (120° interval). In the segment from the time t0 to time t1 (60° interval) in which the U-phase coil is the non-conductive phase, the voltage induced by the pole of the rotor occurs to the U-phase coil. The zero-cross point a thereof is detected, thereby making it possible to detect the position of the rotor. Similarly, in the segment in which the V-phase coil is the non-conductive phase, the zero-cross point b thereof is detected, thereby making it possible to detect the position of the rotor. Similarly, in the segment in which the W-phase coil is the non-conductive phase, the zero-cross point c thereof is detected, thereby making it possible to detect the position of the rotor. Thus, the position of the rotor (point at which the pole of the rotor is changed) can be detected for every 60° can be detected. At the same time, it is possible to determine the conductive phase and the conduction timing for the U-phase, the V-phase, and the W-phase according to the position of the rotor, thereby making it possible to drive the three-phase brushless motor 1.

Here, when the motor rotates at low speed, based on the voltage Vsu induced to the sub-coil Su (U-phase voltage), in lieu of the above 120° conduction, the three-phase brushless motor 1 can be rotary-controlled by the 180° conduction as will be explained later.

Figure 14:
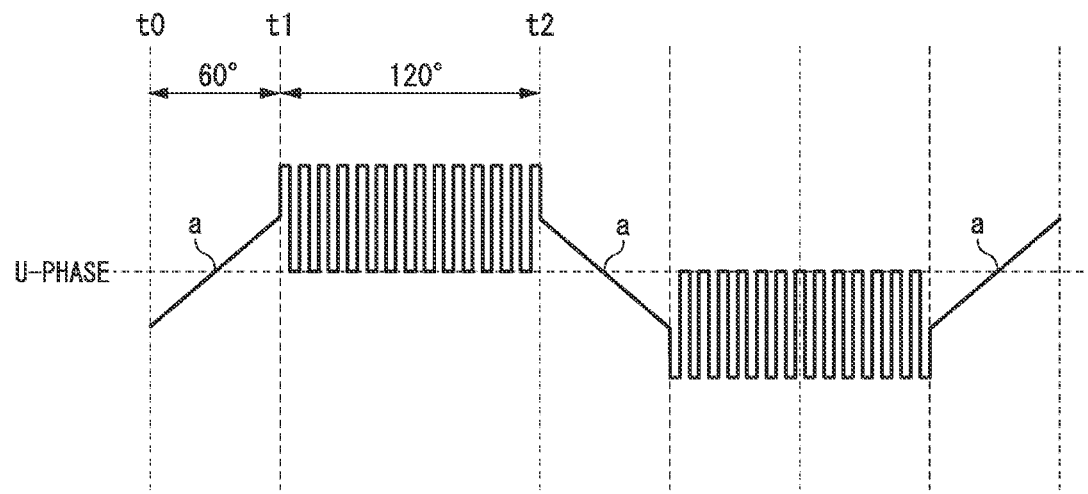
FIG. 14 is a diagram illustrating a duty control.

Additionally, in a case where the 120° conduction controller 27 performs the 120° conduction, it is possible to control the duty rate of On/Off in the intervals in which the respective U-phase motor coil, V-phase motor coil, and W-phase motor coil are conducted, in order to adjust the voltage to be applied to the three-phase brushless motor 1. For example, as shown in FIG. 14 illustrating the duty control, the duty rate of On/Off can be changed in the interval from time t1 to time t2 in which the U-phase coil is conducted. The control of the duty rate is performed similarly with respect to the V-phase and the W-phase. Thus, the conduction controller 23 can change the voltage to be applied to the motor coil in accordance with the number of rotations of the three-phase brushless motor 1. Here, the control of the duty rate can be performed similarly at the time of the 180° conduction as will be explained later.

(Explanation of 180° Conduction)

On the other hand, when the motor rotates at the high number of rotations, the conduction controller 23 controls the 180° conduction controller 28 to perform the 180° conduction with respect to the three-phase brushless motor 1, in order to sufficiently invoke the motor power. In the case of the 180° conduction, it is impossible to detect the zero-cross points of the non-conductive phase as can be detected in the above case of the 120° conduction. For this reason, as explained above, the sub-coil Su is provided in parallel to the U-phase coil, zero-cross points of the U-phase voltage (the voltage of the sine wave induced by the rotation of the motor) Vsu which occurs to the sub-coil Su is detected, thereby detecting that the position of the sub-coil Su matches the middle point of the poles of the rotor 3 (boundary point of the N and S poles).

Then, the above zero-cross point estimator 22 detects the zero-cross points of the voltage Vsu induced only to the one sub-coil Su, and estimates the zero-cross points of the two other phases (the V-phase, the W-phase) based on the zero-cross points of that voltage Vsu (estimates the position of the rotor). Then, the 180° conduction controller 28 changes the conductive phase of the motor coil based on the estimated position of the rotor, thereby controlling changing of the conductive phase and the conduction timing with respect to the U-phase coil, the V-phase coil and the W-phase coil. In other words, in the brushless motor control apparatus 10B, the zero-cross point estimator 22 estimates the zero-cross points, thereby estimating the position of the rotor, and the 180° conduction controller 28 selects a conduction pattern and a conduction timing in accordance with the position of the rotor, thereby performing the 180° conduction on the motor coil.

Here, the details of the 180° conduction method, conduction waveforms thereof, and the like are generally well known, and therefore explanations thereof are omitted. Additionally, also in the above case where the 120° conduction is performed, the position of the rotor is estimated based on the zero-cross points induced to the sub-coil Su and the zero-cross points estimated by the zero-cross point estimator 22, a conduction pattern and a conduction timing are selected in accordance with the position of the rotor, similarly to the case of the 180° conduction, thus performing the 120° conduction on the motor coil.

Thus, the brushless motor control apparatus 10B shown in FIG. 12 operates as the battery charging device in the case where the three-brushless motor 1 is rotary-driven by the engine 5 side and operates as the three-phase AC power generator. Additionally, the brushless motor control apparatus 10B operates as the device for driving the three-brushless motor 1 in the case where the three-brushless motor 1 is used as the starter motor of the engine 5.

Here, the correspondence relationships between the present invention and the above embodiments are supplementarily explained. In the above embodiments, a three-phase brushless motor of the present invention corresponds to the three-phase brushless motor 1. A brushless motor control apparatus of the present invention corresponds to the brushless motor control apparatus 10 shown in FIG. 1, the brushless motor control apparatus 10A shown in FIG. 5, and the brushless motor control apparatus 10B shown in FIG. 12. Additionally, a phase voltage detector of the present invention corresponds to the sub-coil Su. A zero-cross point detector of the present invention corresponds to the zero-cross point detection circuit 13. An engine of the present invention corresponds to the engine 5. A number of engine rotations measurer of the present invention corresponds to the number of engine rotations measurer 21.

Further, a phase control regulator of the present invention corresponds to the phase control regulator unit 24. A short regulator unit of the present invention corresponds to the short regulator unit 25. A batch off controller of the present invention corresponds to the batch off controller 26.

Moreover, a three-bridge circuit of the present invention corresponds to the three-bridge circuit 14. Switching elements of the present invention correspond to the switching elements Q1, Q2, and Q3 on the upper arm and the switching elements Q4, Q5, and Q6 on the lower arm. Additionally, "diodes coupled in inverse parallel to the switching elements" of the present invention correspond to the diodes Dx coupled in inverse parallel to the respective switching elements Q1 to Q6.

Additionally, the brushless motor control apparatus 10 of the above embodiments is configured to drive-control the three-phase brushless motor 1, and rectify and phase-control alternate current output voltages Vu, Vv, and Vw output from the three-phase brushless motor to charge the battery 4 in a case where the three-phase brushless motor 1 is rotary-driven by the engine 5 and operates as the three-phase alternate current power generator. The brushless motor control apparatus 10 includes: the three-phase bridge circuit 14 having arms including switching elements Q1 to Q6 and diodes Dx respectively coupled in inverse parallel to the switching elements Q1 to Q6; the phase voltage detector (sub-coil Su) configured to detect a phase voltage of any one phase of phases of the three-phase brushless motor 1; the zero-cross point detection circuit 13 configured to detect zero-cross points of the phase voltage Vsu of the one phase detected by the phase voltage detector (sub-coil Su); the number of engine rotations measurer 21 configured to measure the number of rotations of the engine based on a cycle of the zero-cross points (time interval between zero-cross points) detected by the zero-cross point detection circuit 13; the phase control regulator unit 24 configured to, when the number of rotations of the engine is greater than or equal to the first number of rotations N1, rectify and phase-control the alternate current output voltages Vu, Vv, and Vw of the respective phases output from the three-phase brushless motor 1, and supply the alternate current output voltages Vu, Vv, and Vw to the battery 4; and the short regulator unit 25 configured to, when the number of rotations of the engine is smaller than the first number of rotations N1, according to the charged voltage of the battery, control the switching elements Q1 to Q6 of the three-phase bridge circuit 14 to perform interphase short circuit of the alternate current output voltages output from the three-phase brushless motor 1, or control the switching elements Q1 to Q6 to be collectively turned off.

The brushless motor control apparatus 10 having such the configuration detects the phase voltage Vsu of any one phase of the phases of the three-phase brushless motor 1 and calculates the number of rotations of the engine based on the cycle (time interval) between zero-cross points of the phase voltage Vsu. Then, when the number of rotation of the engine is smaller than the first number of rotations N1, before it becomes impossible to detect the zero-cross points of the phase voltage Vsu, the control state of the three-phase brushless motor 1 is changed from the state of phase control of the alternate current output voltages Vu, Vv, and Vw by the phase control regulator unit 24 to the state of conduction control of motor coils by the short regulator unit 24. Then, when the number of rotations of the engine exceeds the first number of rotations N1 and the phase voltage Vsu becomes the sufficient voltage level such that the zero-cross points can be detected, the control state of the three-phase brushless motor 1 is changed again to the state of phase control of the alternate current output voltages Vu, Vv, and Vw by the phase control regulator unit 24.

Thus, it is possible to control the conduction state of motor coils of the three-phase brushless motor 1 even in a situation other than engine normal operation, such as engine stall, and prevent the excessive voltage from being applied to an external load.

Additionally, in the above embodiments, the short regulator unit 25 is configured to, when the charged voltage of the battery 4 is greater than or equal to a predetermined determination reference voltage, control the switching elements of the three-phase bridge circuit 14 to perform interphase short circuit of the alternate current output voltages output from the three-phase brushless motor 1. Additionally, the short regulator unit 25 is configured to, when the charged voltage of the battery 4 is smaller than the predetermined determination reference voltage, control the switching elements Q1 to Q6 to be collectively turned off and charge the battery via the diodes Dx based on the alternate current output voltages output from the three-phase brushless motor 1.

When the number of rotations of the engine is smaller than the first number of rotations and when the charged voltage of the battery is greater than or equal to a predetermined determination reference voltage, the brushless motor control apparatus 10 having such the configuration controls the switching elements of the three-phase bridge circuit to perform interphase short circuit of the alternate current output voltages output from the three-phase brushless motor 1. Additionally, when the number of rotations of the engine is smaller than the first number of rotations and when the charged voltage of the battery 4 is smaller than the predetermined determination reference voltage, the brushless motor control apparatus 10 controls the switching elements Q1 to Q6 to be collectively turned off and charges the battery via the diodes Dx coupled in inverse parallel to the switching elements, based on the alternate current output voltages output from the three-phase brushless motor 1.

Thus, it is possible to control the conduction state of motor coils of the three-phase brushless motor 1 even in a situation other than engine normal operation, such as engine stall, and prevent the excessive voltage from being applied to an external load. Additionally, it is possible to charge the battery even when the number of rotations of the engine is smaller than the first number of rotations.

Further, in the above embodiments, the brushless motor control apparatus 10 further includes the batch off controller 26 configured to, when the number of rotations of the engine is smaller than or equal to the second number of rotations N2 that is smaller than the first number of rotations N1 (the first number of rotations N1>the second number of rotations N2), collectively turn off the switching elements Q1 to Q6 of the three-phase bridge circuit 14.

When the number of rotations of the engine is smaller than or equal to the second number of rotations N2 that is smaller than the first number of rotations N1 (the first number of rotations N1>the second number of rotations N2), the brushless motor control apparatus 10 having such the configuration makes the coil terminals of the phases of the three-phase brushless motor 1 in electrically disconnected states.

Thus, when the number of rotations of the engine is low and the engine 5 is in the state of being almost terminated, the three-phase brushless motor 1 is electrically disconnected, and thus control with respect to the three-phase brushless motor 1 can be terminated.

Moreover, in a case that the three-phase brushless motor 1 operates as the three-phase alternate current power generator, the brushless motor control apparatus 10 according to the present invention is configured to rectify and phase-control the alternate current output voltages output from the three-phase brushless motor 1, thus charging the battery 4. Additionally, in a case where the engine 5 is started-up, the brushless motor control apparatus 10 is configured to drive-control the three-phase brushless motor 1 as a starter motor of the engine 5.

In a case that the three-phase brushless motor 1 is rotary-driven by the engine 5 side and operates as the three-phase alternate current power generator, the brushless motor control apparatus 10 having such the configuration charges the battery 4 based on the alternate current output voltages output from the three-phase brushless motor 1. Additionally, in a case where the engine 5 is started-up, the brushless motor control apparatus 10 drive-controls the three-phase brushless motor 1 as a starter motor of the engine 5.

Thus, it is possible to cause the brushless motor control device 10 to operate as the device for driving the starter motor of the engine 5 as well as the battery charging device.

Although the embodiments of the present invention has been explained above, the brushless motor control device of the present invention can perform regulator control even in a situation other than the engine normal operation, such as engine stall, and can prevent the excessive voltage from being applied to a product or an external load.

INDUSTRIAL APPLICABILITY

The brushless motor control apparatus according to one aspect of the present invention is applicable to a device for controlling three-phase brushless motor to be used as a starter motor of an internal combustion (engine) and an AC power generator. Particularly, the brushless motor control apparatus can be used as a brushless motor control apparatus that, when a three-phase brushless motor (three-phase AC power generator) without a position sensor is controlled, can control the conduction state of motor coils of the three-phase brushless motor even in a situation other than engine normal operation, such as engine stall, and prevent the excessive voltage from being applied to an external load.

DESCRIPTION OF REFERENCE NUMERALS

1: three-phase brushless motor
2: stator
2a: sub-coil Su
3: rotor
4: battery
5: engine
6: coil
10, 10A, 10B: brushless motor control apparatus
11: Hi-side pre-driver circuit
12: Lo-side pre-driver circuit
13: zero-cross point detection circuit
14: three-phase bridge circuit
20: controller
21: number of engine rotations measurer
22: zero-cross point estimator
23: conduction controller
24: phase control regulator unit
24a: advance/delayed angle controller
25: short regulator unit
26: batch off controller
27: 120° conduction controller
28: 180° conduction controller
31: reference voltage circuit
32: difference amplifier
41: determination reference voltage circuit
42: comparator

The invention claimed is:

1. A brushless motor control apparatus configured to drive-control a three-phase brushless motor, and rectify and phase-control alternate current output voltages output from the three-phase brushless motor to charge a battery in a case where the three-phase brushless motor is rotary-driven by an engine and operates as a three-phase alternate current power generator, the brushless motor control apparatus comprising:
   a three-phase bridge circuit having arms each including a switching element and a diode coupled in inverse parallel to the switching element;
   a phase voltage detector configured to detect a phase voltage of any one phase of phases of the three-phase brushless motor;
   a zero-cross point detector configured to detect zero-cross points of the phase voltage of said any one phase detected by the phase voltage detector;
   a number of engine rotations measurer configured to measure a number of rotations of the engine based on a cycle of the zero-cross points detected by the zero-cross point detector;
   a phase control regulator unit configured to, when the number of rotations of the engine is greater than or equal to a first number of rotations at which the zero-cross points become unable to be detected, rectify and phase-control the alternate current output voltages of respective phases output from the three-phase brushless motor, and supply the alternate current output voltages to the battery; and
   a short regulator unit configured to, when the number of rotations of the engine is smaller than the first number of rotations and when a charged voltage of the battery is greater than or equal to a predetermined determination reference voltage, control the switching elements of the three-phase bridge circuit to perform interphase short circuit of the alternate current output voltages output from the three-phase brushless motor, or control the switching elements to be collectively turned off.

2. The brushless motor control apparatus according to claim 1, wherein the short regulator unit is configured to, when the charged voltage of the battery is greater than or equal to a predetermined determination reference voltage, control the switching elements of the three-phase bridge circuit to perform interphase short circuit of the alternate current output voltages output from the three-phase brushless motor, and the short regulator unit is configured to, when the charged voltage of the battery is smaller than the predetermined determination reference voltage, control the switching elements to be collectively turned off and charge the battery via the diodes based on the alternate current output voltages output from the three-phase brushless motor.

3. The brushless motor control apparatus according to claim 1, further comprising:

a batch off controller configured to, when the number of rotations of the engine is smaller than or equal to a second number of rotations that is smaller than the first number of rotations (first number of rotations>second number of rotations) and is not contributing to charging of the battery, collectively turn off the switching elements of the three-phase bridge circuit.

4. The brushless motor control apparatus according to claim 1, wherein in a case that the three-phase brushless motor operates as the three-phase alternate current power generator, the brushless motor control apparatus is configured to rectify and phase-control the alternate current output voltages output from the three-phase brushless motor, thus charging the battery, and in a case where the engine is started-up, the brushless motor control apparatus is configured to drive-control the three-phase brushless motor as a starter motor of the engine.

5. A brushless motor control method of drive-controlling a three-phase brushless motor, and rectifying and phase-controlling alternate current output voltages output from the three-phase brushless motor to charge a battery in a case where the three-phase brushless motor is rotary-driven by an engine and operates as a three-phase alternate current power generator, the brushless motor control method comprising:

a step of constituting arms of a three-phase bridge circuit, each of the arms including a switching element and a diode coupled in inverse parallel to the switching element;

a phase voltage detection step of detecting a phase voltage of any one phase of phases of the three-phase brushless motor;

a zero-cross point detection step of detecting zero-cross points of the phase voltage of said any one phase detected in the phase voltage detection step;

a number of engine rotations measurement step of measuring a number of rotations of the engine based on a cycle of the zero-cross points detected in the zero-cross point detection step;

a phase control regulator step of, when the number of rotations of the engine is greater than or equal to a first number of rotations at which the zero-cross points become unable to be detected, rectifying and phase-controlling alternate current output voltages of respective phases output from the three-phase brushless motor, and supplying the alternate current output voltages to the battery; and a short regulator step of, when the number of rotations of the engine is smaller than the first number of rotations and when a charged voltage of the battery is greater than or equal to a predetermined determination reference voltage, controlling the switching elements of the three-phase bridge circuit to perform interphase short circuit of the alternate current output voltages output from the three-phase brushless motor, or controlling the switching elements to be collectively turned off.

\* \* \* \* \*